(12) United States Patent
Yoshida

(10) Patent No.: US 8,727,432 B2
(45) Date of Patent: May 20, 2014

(54) SUNROOF APPARATUS

(75) Inventor: Osamu Yoshida, Higashi-Hiroshima (JP)

(73) Assignee: Webasto SE, Stockdorf (DE)

( * ) Notice: Subject to any disclaimer, the term of this patent is extended or adjusted under 35 U.S.C. 154(b) by 0 days.

(21) Appl. No.: 13/698,245

(22) PCT Filed: Dec. 6, 2011

(86) PCT No.: PCT/IB2011/002951
§ 371 (c)(1),
(2), (4) Date: Jan. 17, 2013

(87) PCT Pub. No.: WO2012/076965
PCT Pub. Date: Jun. 14, 2012

(65) Prior Publication Data
US 2013/0193720 A1 Aug. 1, 2013

(30) Foreign Application Priority Data
Dec. 6, 2010 (JP) .................. 2010-271437

(51) Int. Cl.
*B60J 7/185* (2006.01)
*B60J 7/057* (2006.01)
*B60J 7/047* (2006.01)
*B60J 7/053* (2006.01)

(52) U.S. Cl.
USPC ....... 296/223; 296/216.03; 296/222; 296/224

(58) Field of Classification Search
USPC ........................... 296/216.01–224
See application file for complete search history.

(56) References Cited

U.S. PATENT DOCUMENTS

| 7,708,337 | B2 * | 5/2010 | Ito et al. | ................ 296/224 |
| 7,850,231 | B2 * | 12/2010 | Ito et al. | ........... 296/220.01 |
| 7,854,475 | B2 * | 12/2010 | Ito et al. | ........... 296/216.02 |
| 2002/0024238 | A1 | 2/2002 | Faber | |
| 2005/0110307 | A1 | 5/2005 | Grimm | |
| 2005/0231007 | A1 | 10/2005 | Oechel | |

FOREIGN PATENT DOCUMENTS

| EP | 1533159 A1 | 5/2005 |
| EP | 1586475 A2 | 10/2005 |
| EP | 2028031 A2 | 2/2009 |
| JP | 2009113680 A | 5/2009 |

OTHER PUBLICATIONS

PCT Search Report PCT/IB2011/002951, dated, May 14, 2012.

* cited by examiner

*Primary Examiner* — Dennis H Pedder
(74) *Attorney, Agent, or Firm* — Fitch, Even, Tabin & Flannery LLP

(57) ABSTRACT

A sunroof apparatus including a front panel and a rear panel closing a roof opening, having a slider coupling mechanism interlocking between a front slider actuating the front panel and a rear slider actuating the rear panel while achieving a simplified structure and compacted size thereof with its number of parts reduced. The coupling arm is swingably pivotally supported by the rear slider, and the coupling arm is provided with a stopper for regulating the back-and-forth movement of the rear slider by fitting to a locking hole formed in the guide rail, and the front slider is provided with a coupling pin and the coupling arm is provided with a coupling cam groove, and the front slider is moved backward so that the coupling pin and the coupling cam groove are engaged with each other to thereby swing the coupling arm so that the stopper is disengaged from the locking hole and the rear slider being interlocked with the front slider is rendered to be moved back and forth.

5 Claims, 17 Drawing Sheets

Fig. 12
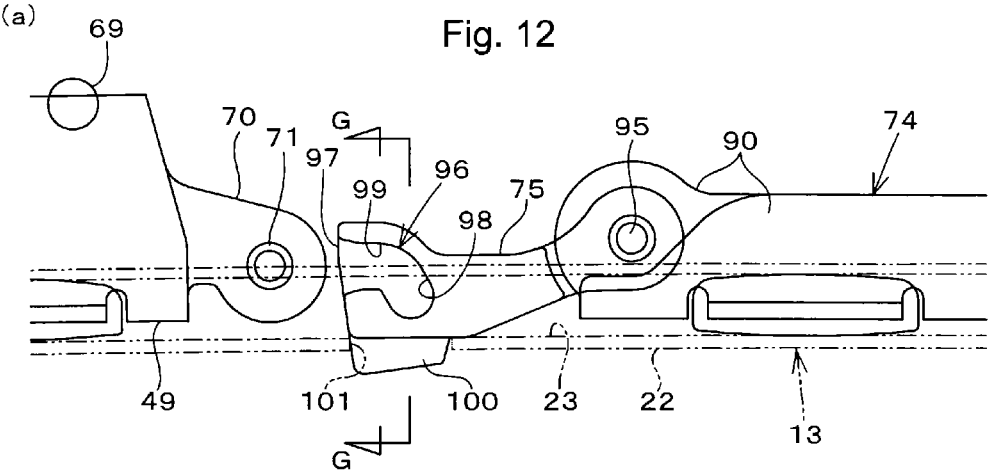
(a)
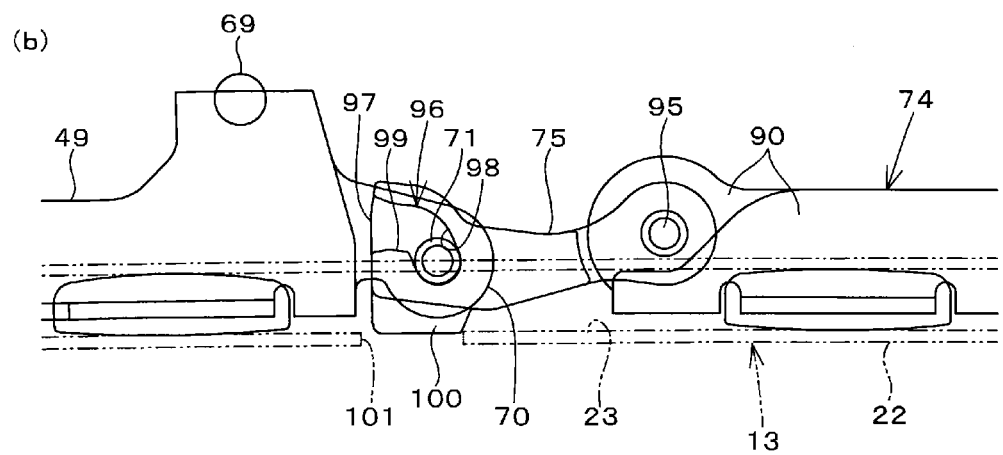
(b)
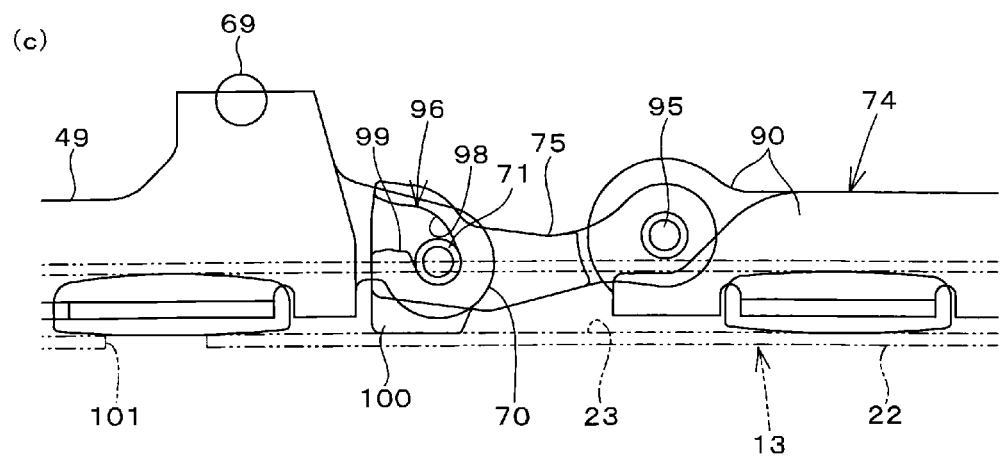
(c)

Fig. 15
(a)
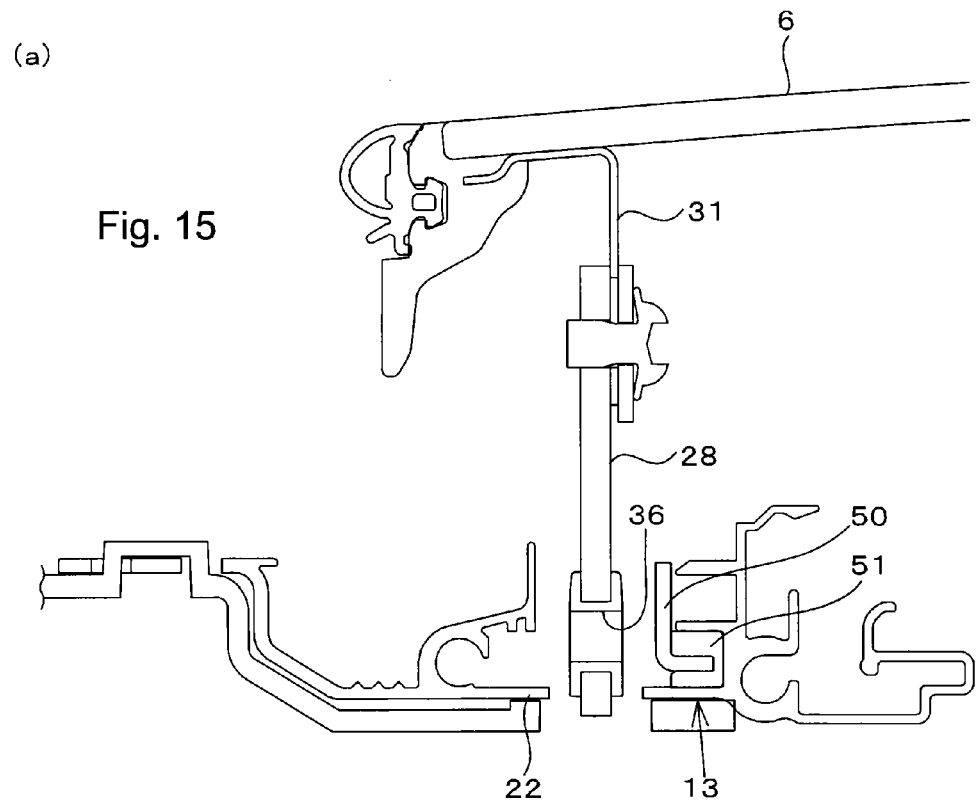
(b)
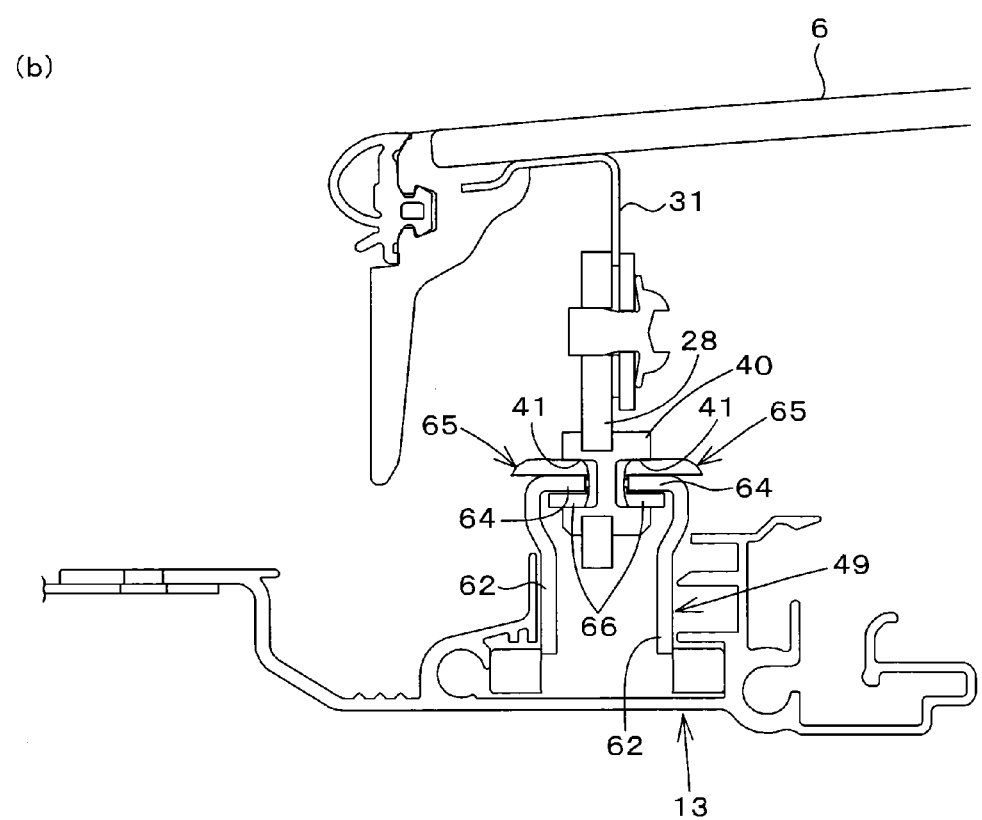

Fig. 16
(a)
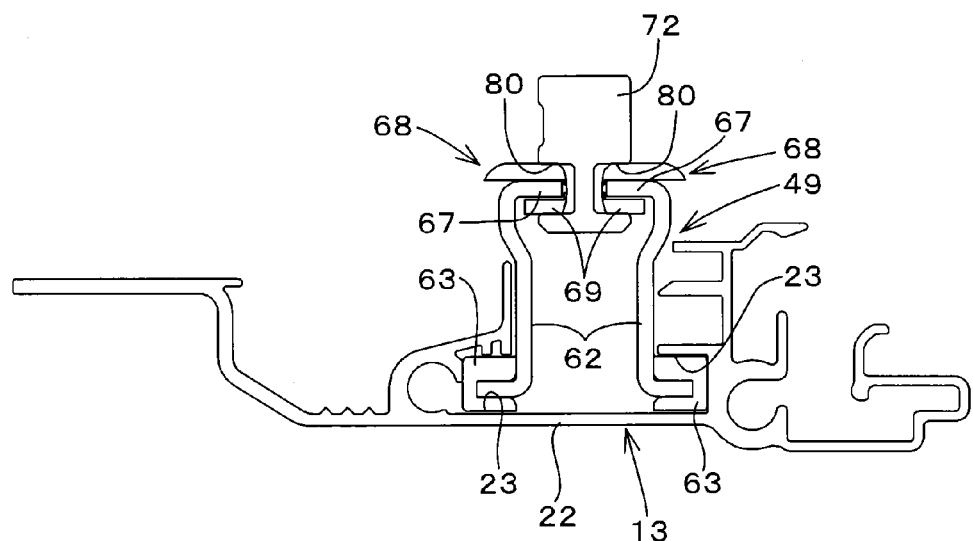
(b)
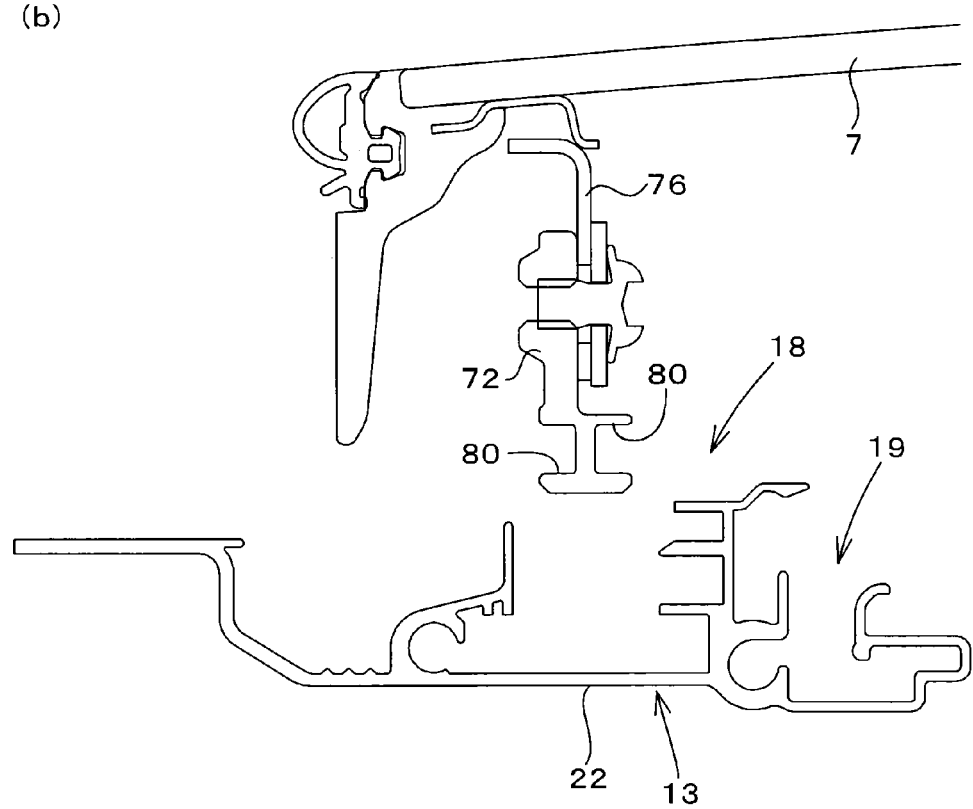

Fig. 17
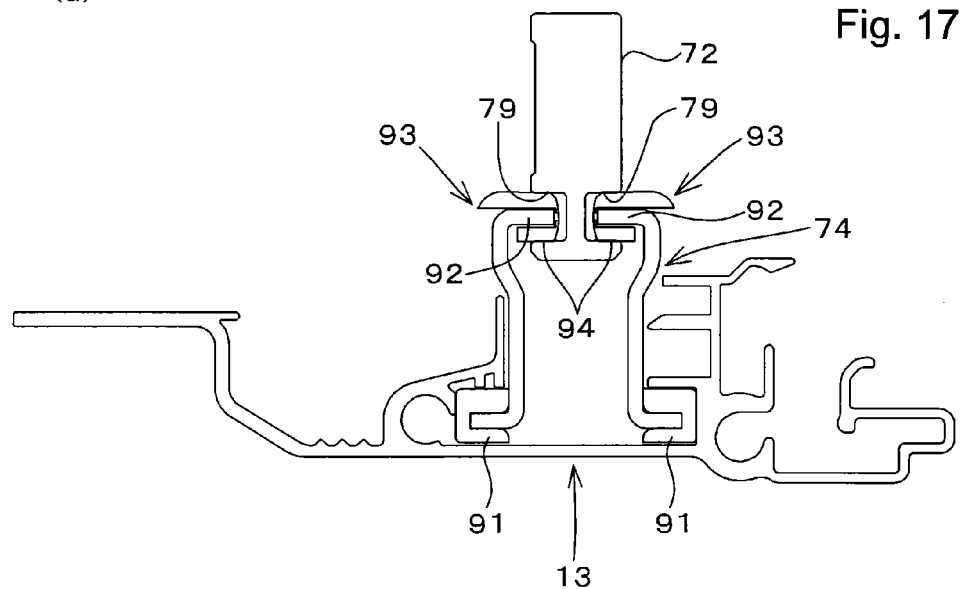
(a)
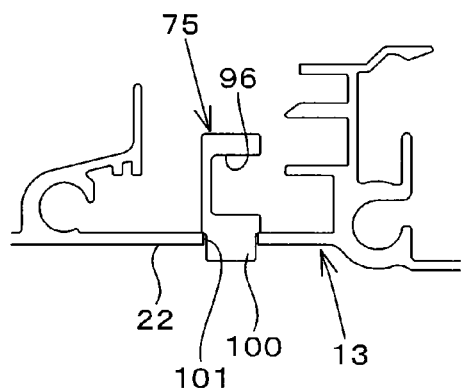
(b)
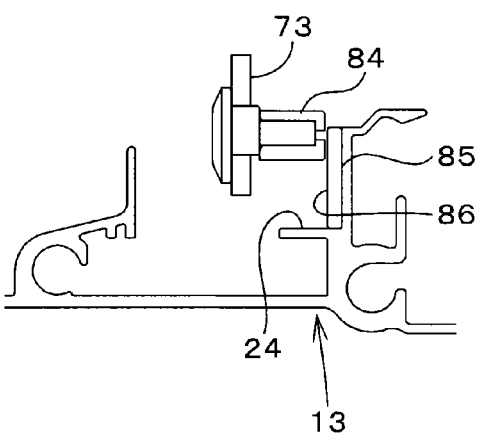
(c)
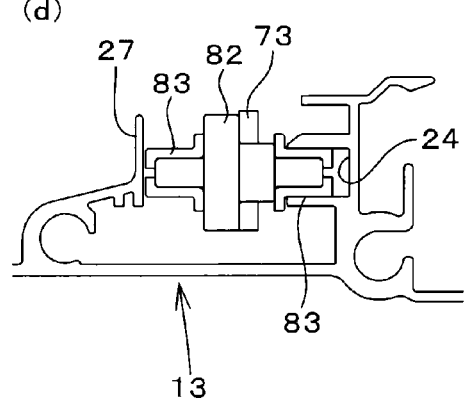
(d)

SUNROOF APPARATUS

CROSS-REFERENCE TO RELATED APPLICATIONS

This application is a U.S. National Stage filing under 35 U.S.C. 371 of International Application No. PCT/IB2011/002951, filed Dec. 6, 2011, designating the United States and claims the benefit of foreign priority from Japanese Patent Application Number 2010-271437, filed Dec. 6, 2010, the entire disclosures of which are incorporated herein by reference.

TECHNICAL FIELD

The present invention relates to a sunroof apparatus provided in a roof of a vehicle.

BACKGROUND ART

Conventionally, there has been a sunroof apparatus that includes a front panel retractably opening/closing a front portion of a roof opening formed in a roof of a vehicle, a rear panel retractably opening/closing a rear portion of the roof opening, a front slider actuating the front panel by moving back and forth, a rear slider actuating the rear panel by moving back and forth, and a guide rail guiding the front slider and the rear slider movably in a back-and-forth direction (see Patent Literature 1).

In this sunroof apparatus, it is constructed that, by moving the front slider backward, a rear portion of the front panel is tilted up by the front portion of the roof opening, and the front panel is then moved backward in the tilted-up state. Then, the front slider is brought closer to the rear slider so as to be coupled to the rear slider, and thereafter the rear slider being interlocked with the front slider is moved back and forth. Thus, it becomes possible to actuate the front panel and rear panel by a single drive motor.

A slider coupling mechanism interlocking between the front slider and the rear slider of the sunroof apparatus is constructed as follows.

In the rear portion of the front slider, a coupling piece including a coupling cam groove is provided in a rearward protruded state, and the rear portion of the coupling cam groove is opened backward and the front portion thereof is formed to be forward inclined in a downward slope state.

In the front portion of the rear slider, an extended portion is provided in a forward protruded state and a coupling arm is provided in a forward protruded state.

The rear portion of the coupling arm is pivotally supported so that the frontward side thereof is rendered to be vertically swingable, and a coupling pin is provided in the front end side of the coupling arm in a laterally penetrating state. Further, a long-sized hole is formed in the front end side of the extended portion for regulating a vertical swing range of the coupling arm so that the coupling pin is inserted through the long-sized hole. And the coupling arm is biased upward by a spring.

An arm locking member fixed to the guide rail is located in the frontward side of the coupling arm and a locking groove with the coupling pin inserted thereto is formed in the side surface of the arm locking member. The locking groove is formed of a vertically longitudinal groove portion, a back-and-forth oriented transverse groove portion positioned rearward and below the longitudinal groove portion, and a curved groove portion connecting between the longitudinal groove portion and the transverse groove portion.

In the slider coupling mechanism, in a state (a coupling release state) that the coupling piece of the front slider is positioned in the frontward side of the coupling pin, the coupling pin is positioned at a top edge of the long-sized hole and the coupling pin is fitted to the longitudinal groove portion of the locking groove. Since coupling pin is fitted to the longitudinal groove portion of the locking groove, the back-and-forth movement of the rear slider is regulated.

From this state, when the front slider is moved backward and the coupling cam groove is fitted to the coupling pin, the coupling pin is guided along the coupling cam groove so as to be pulled down against the biasing force of the spring and the coupling pin is moved toward the lower end side of the long-sized hole of the extended portion and is moved to the front end side of the transverse groove portion of the locking groove.

When the coupling pin is fitted to the front portion of the coupling cam groove, the front slider and the rear slider are brought in a coupled state so that the rear slider is interlocked with the front slider so as to be movable back and forth. Further, when the coupling pin is moved toward the front end side of the transverse groove portion of the locking groove formed in the arm locking member, the regulation of the back-and-forth movement of the rear slider is released so that the rear slider is rendered to be movable back and forth.

CITATION LIST

Patent Literature

Patent Literature 1: Japanese Unexamined Patent Publication JP-A 2009-113680

SUMMARY OF INVENTION

Technical Problem

The slider coupling mechanism interlocking between the front slider and the rear slider in the conventional sunroof apparatus includes the coupling piece provided in the front slider and including the coupling cam groove, the coupling arm vertically swingably provided in the rear slider, the extended portion including the long-sized hole for regulating the vertical swing range of the coupling arm, the coupling pin provided in the coupling arm, the spring biasing the coupling arm upward, and the arm locking member including the locking groove to which the coupling pin is inserted. Therefore, the slider coupling mechanism has a problem that the number of parts is large with a complicated structure and a large size of the mechanism.

Therefore, in view of the above problems, the present invention has been made having an object to provide a sunroof apparatus including a slider coupling mechanism interlocking between a front slider and a rear slider while achieving a simplified structure and compacted size thereof with its number of parts reduced.

Solution to Problem

In order to solve the technical problems mentioned above, the technical means made by the present invention provides a sunroof apparatus including a front panel retractably opening/closing a front portion of a roof opening formed in a roof of a vehicle and a rear panel retractably opening/closing a rear portion of the roof opening, the sunroof apparatus comprising:

a front slider actuating the front panel by moving back and forth; a rear slider actuating the rear panel by moving back and forth; and a guide rail guiding the front slider and the rear slider in a manner of being movable back and forth, wherein the front slider is moved backward so as to be coupled to the rear slider, whereby the rear slider being interlocked with the front slider is rendered to be moved back and forth, wherein an coupling arm is swingably pivotally supported in a front portion of the rear slider, and the coupling arm is provided with a stopper for regulating the back-and-forth movement of the rear slider by fitting to a locking hole formed in the guide rail, wherein one of the front slider and the coupling arm is provided with a coupling pin and the other thereof is provided with a coupling cam groove interlocking between the front slider and the coupling arm by engaging with the coupling pin, and wherein the front slider is moved backward so that the coupling pin and the coupling cam groove are engaged with each other to thereby swing the coupling arm so that the stopper is disengaged from the locking hole and the rear slider being interlocked with the front slider is rendered to be moved back and forth.

In this construction, it is preferable that the coupling arm is pivotally supported by the rear slider in a manner of being vertically swingable, and the locking hole is formed in a bottom wall of the guide rail, and the coupling arm is swung upward upon engagement of the coupling pin with the coupling cam groove so that the stopper is disengaged from the locking hole, and when the rear slider is moved back and forth in the rearward than the locking hole upon disengagement of the stopper from the locking hole, the stopper is rendered to slide on the bottom wall of the guide rail.

Preferably, the front slider is provided with the coupling pin, and the coupling arm is provided with the coupling cam groove. Further, a spring is preferably provided for biasing the stopper in a direction of being fitted to the locking hole.

Advantageous Effects of Invention

According to the present invention, since the slider coupling mechanism interlocking between the front slider and the rear slider includes a coupling arm provided in the rear slider, a coupling pin provided in one of the front slider and the coupling arm and a coupling cam groove provided in the other thereof, a stopper provided in the coupling arm, and a locking hole formed in the guide rail, the slider coupling mechanism can be simplified in structure and compacted in size while reducing the number of parts thereof.

BRIEF DESCRIPTION OF DRAWINGS

FIG. 12 is a side view showing a coupling operation between the front slider and the rear slider.

FIG. 15 (a) is a sectional view across a line B-B in FIG. 4, and FIG. 15 (b) is a sectional view across a line C-C in FIG. 4.

FIG. 16 (a) is a sectional view across a line D-D in FIG. 4, and FIG. 16 (b) is a sectional view across a line E-E in FIG. 4.

FIG. 17 (a) is a sectional view across a line F-F in FIG. 4, and FIG. 17 (b) is a sectional view across a line G-G in FIG. 1, FIG. 17 (c) is a sectional view across a line H-H in FIG. 13, and FIG. 17 (d) is a sectional view across a line J-J in FIG. 13.

DESCRIPTION OF EMBODIMENTS

Figure 1:
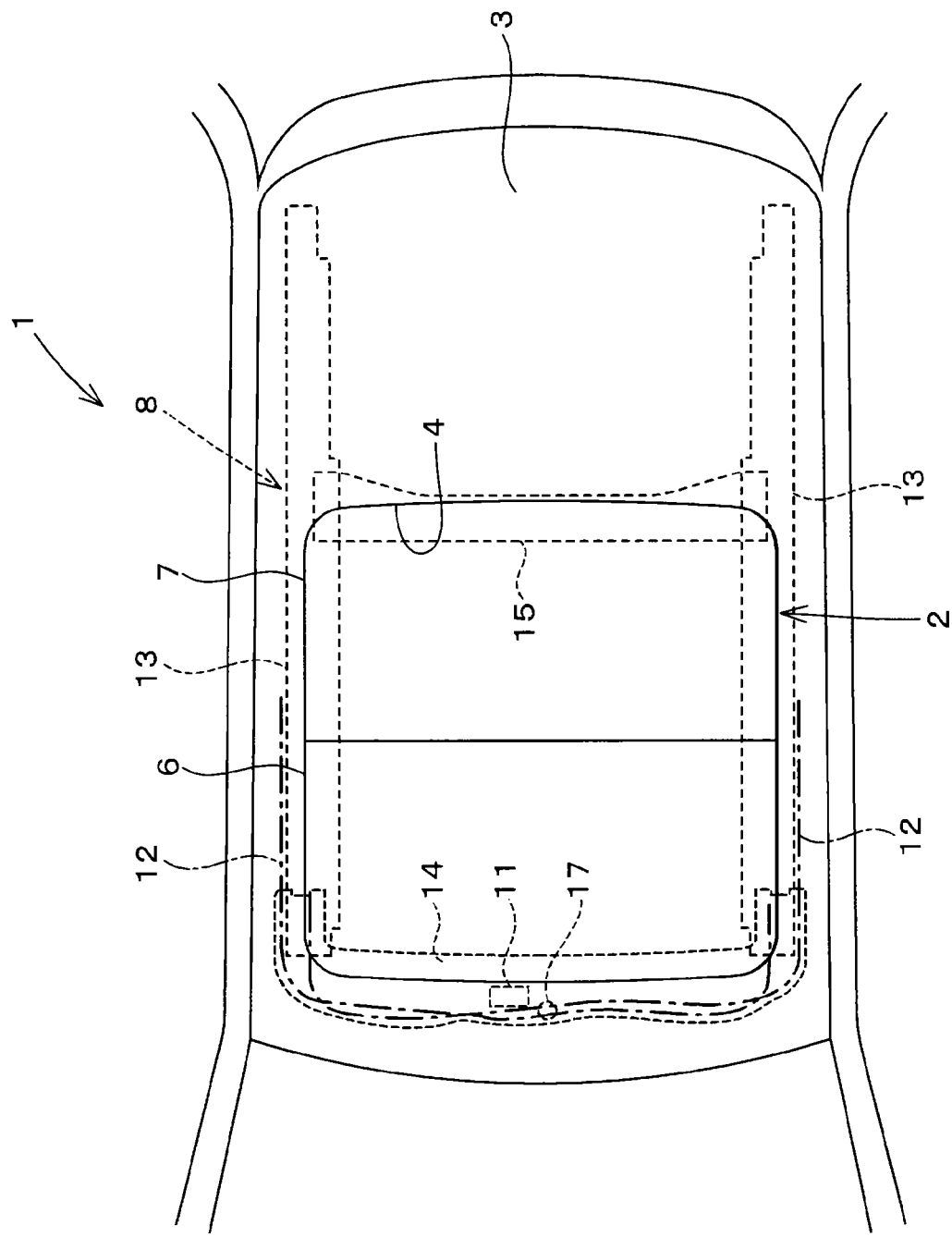
FIG. 1 is a plan view of a vehicle.

An embodiment of the present invention is described below referring to the drawings.

FIG. 1 shows a plan view of a vehicle 1 provided with a sunroof apparatus 2, wherein a rectangular roof opening 4 is formed in a roof 3 of the vehicle 1.

In the following description, back-and-forth, lateral (right and left) and vertical (up and down) directions are conforming to directions as viewed from a driver seated in a driver's seat. Also, a laterally inward direction is referred to a direction from an edge in a lateral direction of the vehicle 1 toward a central portion in the lateral direction, and a laterally outward direction is referred to a direction from the central portion in the lateral direction of the vehicle 1 toward the edge in the lateral direction. Therefore, regarding a member provided in a side portion in the lateral direction of the vehicle 1, an inward direction in the lateral direction is referred to a direction toward a central side in the lateral direction of the vehicle 1 and an outward direction in the lateral direction is referred to a direction toward an opposite side to the central side in the lateral direction of the vehicle 1.

Figure 2:
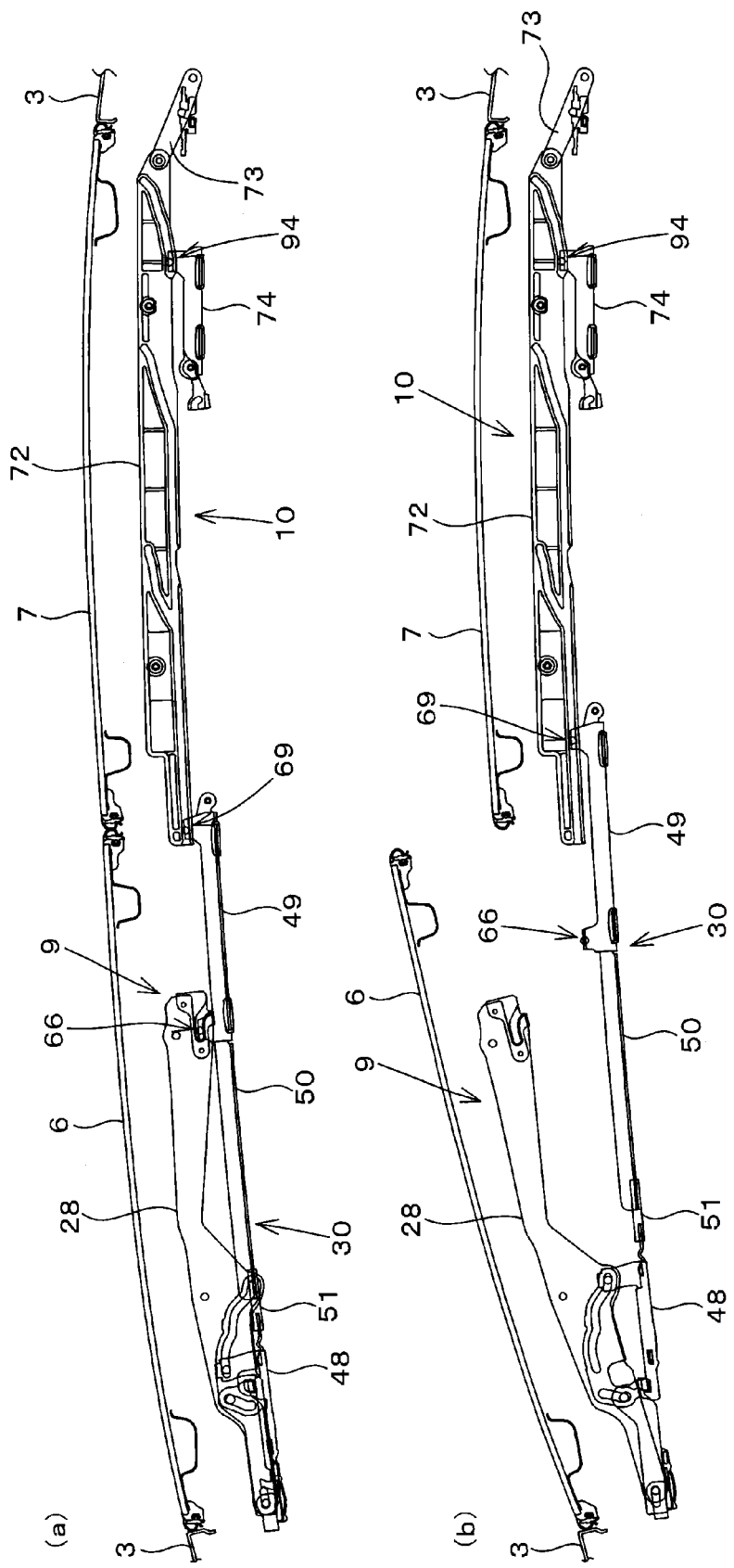
FIG. 2 (a) is a side view of a sunroof apparatus in a state that a front panel and a rear panel are in a fully closed state of closing a roof opening, and FIG. 2 (b) is a side view of the sunroof apparatus in a state that the front panel is fully tilted up.
Figure 3:
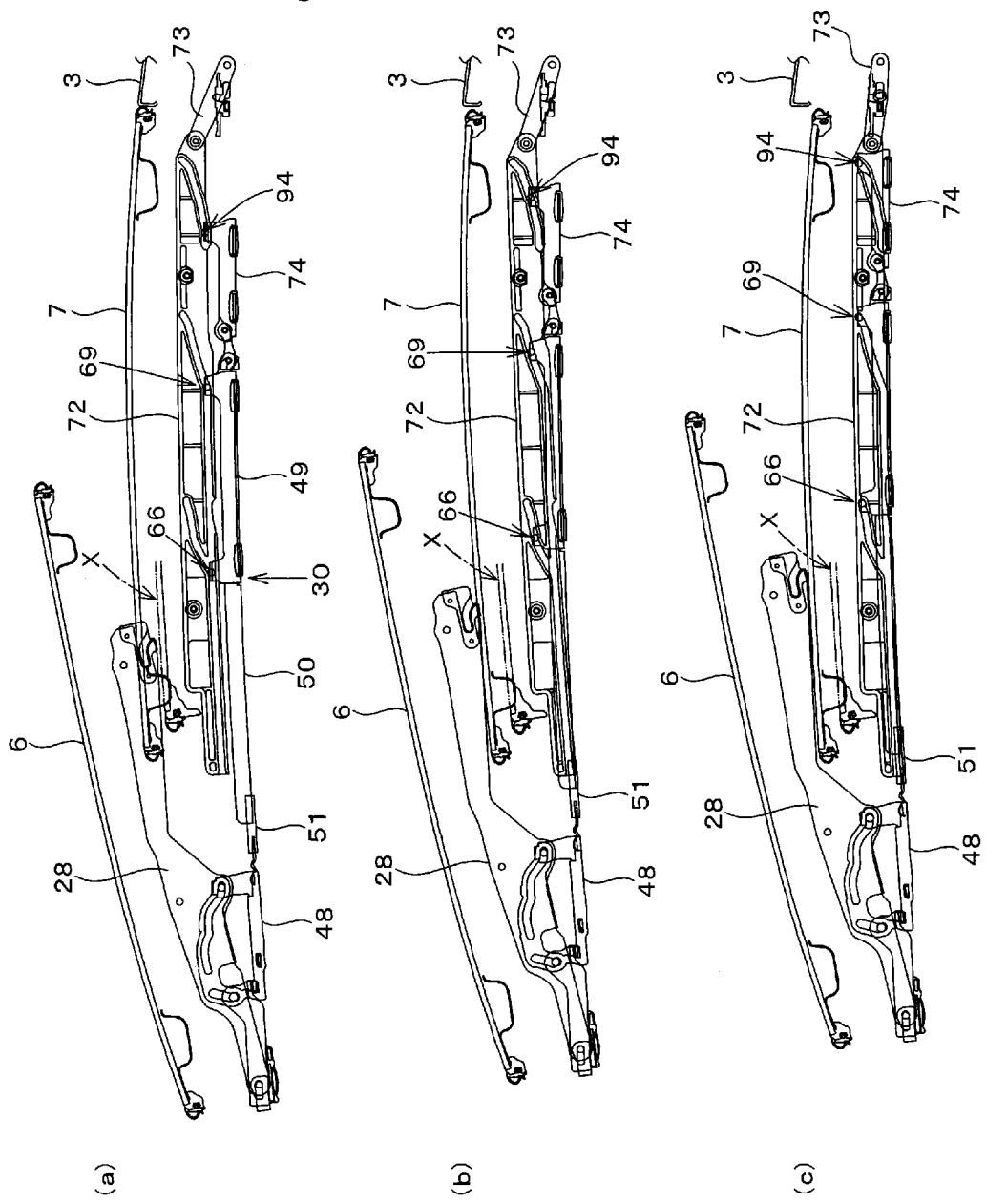
FIG. 3 (a) is a side view of the sunroof apparatus in a state that the front panel is moved backward in a fully tilted up state so that a front slider is coupled to a rear slider, FIG. 3 (b) is a side view of the sunroof apparatus in a state that the rear panel is lowered (lifted down) relative to the position shown in FIG. 3 (a) and moved toward a lift-down completion state, and FIG. 3 (c) is a side view of the sunroof apparatus in a state that the rear panel is lowered (lifted down) relative to the position shown in FIG. 3 (b) and moved into the lift-down completion state.

As shown in FIGS. 1 to 3, the sunroof apparatus 2 includes a front panel 6 retractably opens and closes a front portion of the roof opening 4, a rear panel 7 retractably opens and closes a rear portion of the roof opening 4, a frame 8 fixedly attached to a lower surface side of the roof 3, a front panel actuator 9 actuating an operation of opening and closing the front panel 6, a rear panel actuator 10 actuating an operation of opening and closing the rear panel 7, a drive motor 11 driving these panel actuators 9 and 10, and a drive cable 12 transferring power of the drive motor 11 to the back-and-forth panel actuators 9 and 10.

This sunroof apparatus 2 is a type of driving the front panel actuator 9 (actuating the front panel 6) and the rear panel actuator 10 (actuating the rear panel 7) by a single drive motor 11.

As shown in FIG. 1, the frame 8 includes a pair of right and left guide rails 13 extending in a back-and-forth direction, a front frame member 14 coupling between the front end sides of the right and left guide rails 13, and a rear frame member 15 coupling between the back-and-forth intermediate portions of the right and left guide rails 13 so that a frame opening 16 is defined between the front and rear frame members 14 and 15.

The front portions of the right and left guide rails 13 are located below the right and left side edges of the roof opening 4, and the front frame member 14 is located below the front edge portion of the roof opening 4, and the rear frame member 15 is located below the rear edge portion of the roof opening 4. Therefore, the frame opening 16 is located in a position corresponding to a position below the roof opening 4 so that the frame opening 16 is freely opened and closed by a sunshade (not shown).

The drive motor 11 is attached to the front frame member 14, and a drive gear 17 rotationally driven by the drive motor 11 is provided in the vicinity of the drive motor 11, wherein the drive cable 12 is engaged with the drive gear 17 so that the drive cable 12 is configured to be pushed and pulled in the longitudinal direction by rotationally driving the drive gear 17 by the drive motor 11.

A pair of right and left front panel actuators 9 and a pair of right and left rear panel actuators 10 are respectively provided, and the paired front panel actuators 9 are located below the right and left side edges of the front panel 6 (i.e., provided between the front panel 6 and the right and left guide rails 13), and the paired rear panel actuators 10 are located below the right and left side edges of the rear panel 7 (i.e., provided between the rear panel 7 and the right and left guide rails 13).

Also, a pair of drive cables 12 is provided corresponding to the respective front and rear panel actuators 9 and 10.

Figure 14:
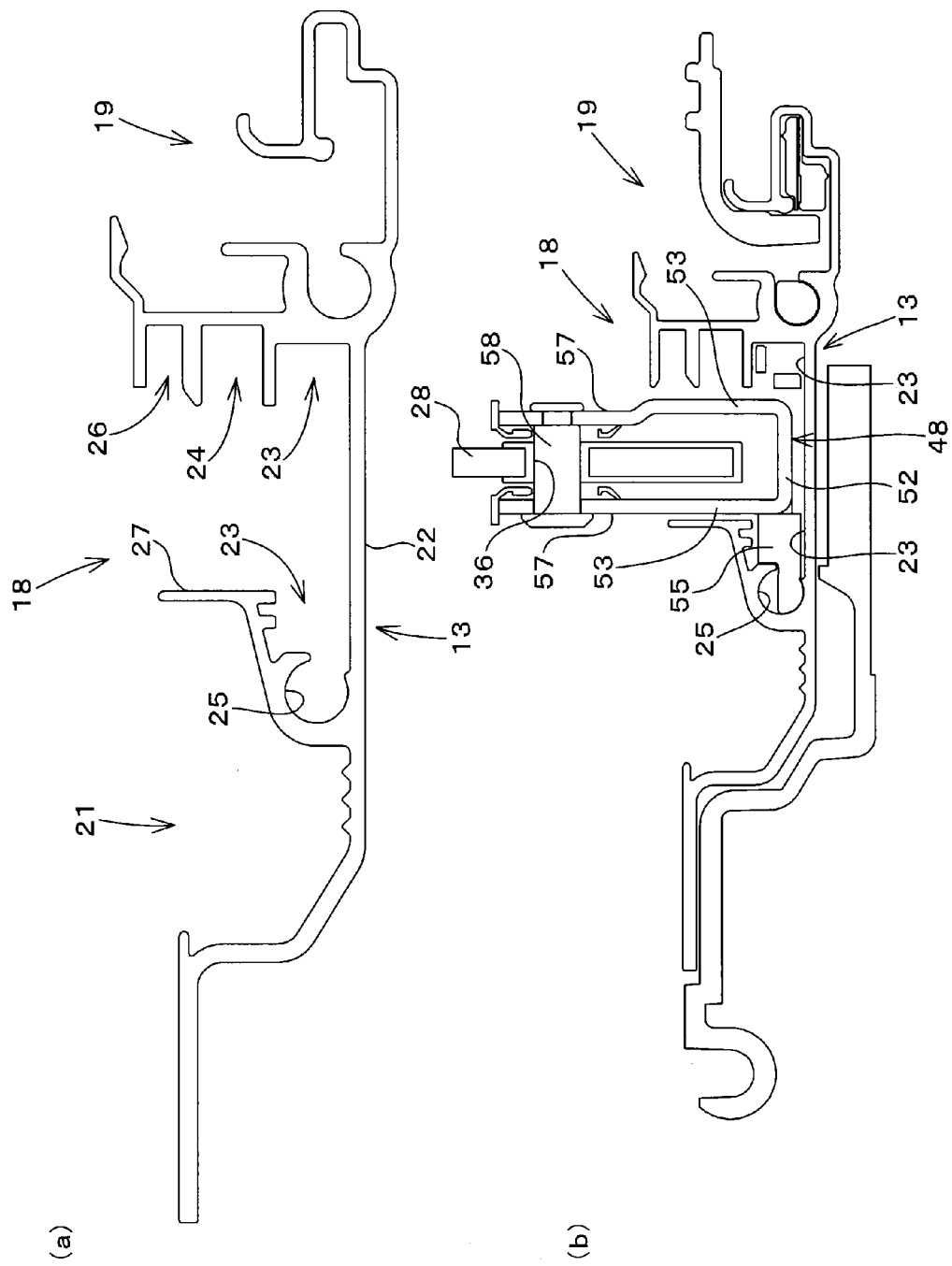
FIG. 14 (a) is a sectional view of a guide rail, and FIG. 14 (b) is a sectional view across a line A-A in FIG. 4.

Each of the guide rails 13 is formed with an extrusion molding material to have a mild curved shape protruding upward, and as shown in FIG. 14 (a), it includes a panel guide portion 18, a sunshade guide portion 19 provided inwardly in the lateral direction of the panel guide portion 18, and a tub portion 21 provided outwardly in the lateral direction of the panel guide portion 18.

In the panel guide portion 18, there are formed a pair of laterally inward and outward slide guide grooves 23 with an upper surface of a bottom wall 22 of the guide rail 13 as a sliding surface thereof, a timing guide groove 24 located above the inward slide guide groove 23, a cable guide groove 25 located outwardly in the lateral direction of the outward slide guide groove 23, an attachment groove 26 located above the timing guide groove 24, and a regulation wall 27 laterally opposite to the timing guide groove 24, along the longitudinal direction of the guide rail 13.

The inward slide guide groove 23 is formed in a U-character shape that opens outwardly in the lateral direction, and the outward slide guide groove 23 is formed in a U-character shape that opens inwardly in the lateral direction, and these slide guide grooves 23 are laterally opposed to each other. In addition, an intermediate space between the laterally inward and outward slide guide grooves 23 in the panel guide portion 18 is opened upwardly.

Each of the timing guide groove 24 and the attachment groove 26 is formed in a U-character shape that opens outwardly in the lateral direction.

The cable guide groove 25 is communicated with the outward slide guide groove 23 and the drive cable 12 is inserted thereto from the front.

Figure 4:
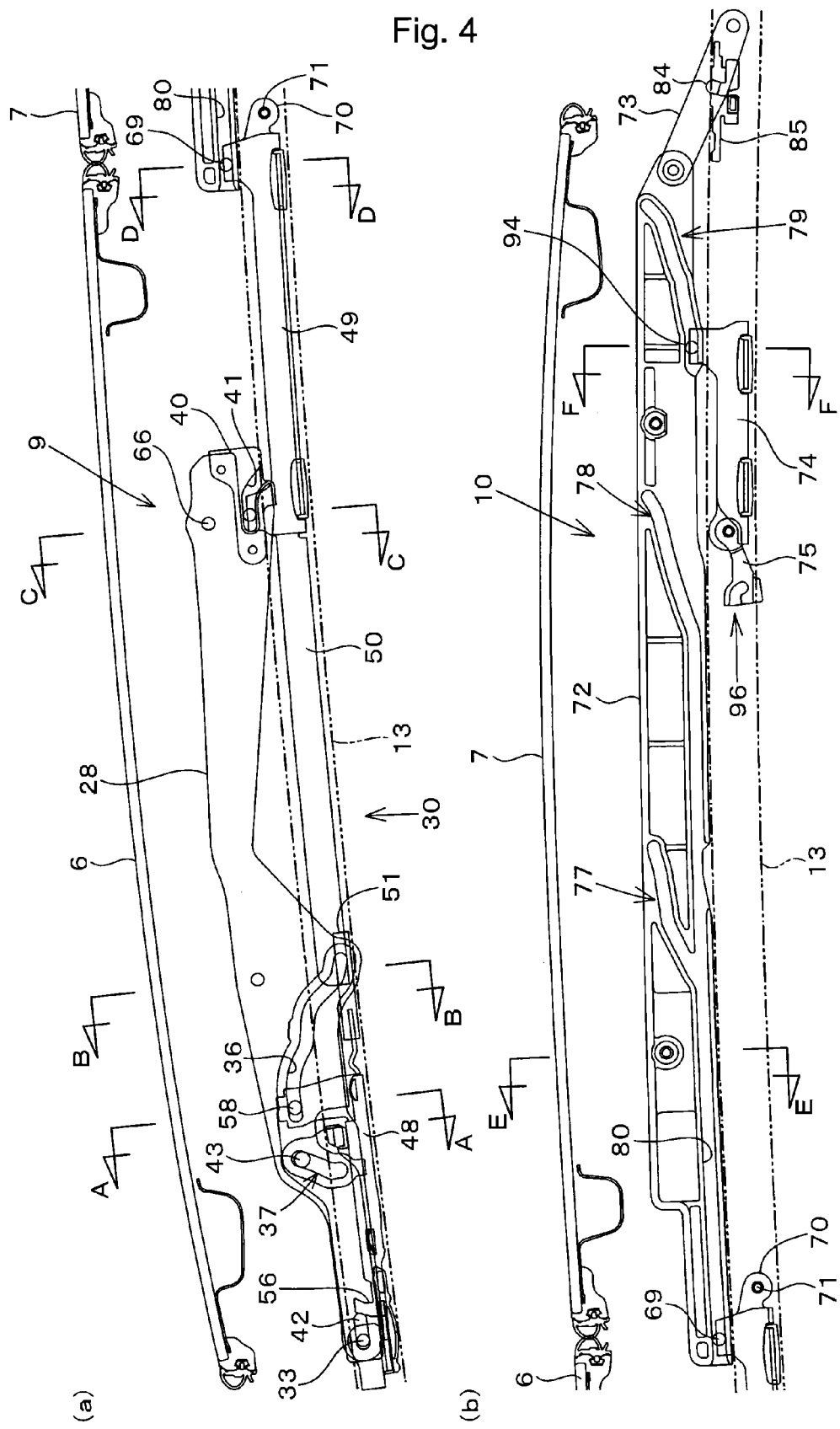
FIG. 4 (a) is a side view of the sunroof apparatus in a state that the front panel is fully closed, and FIG. 4 (b) is a side view of the sunroof apparatus in a state that the rear panel is fully closed.
Figure 5:
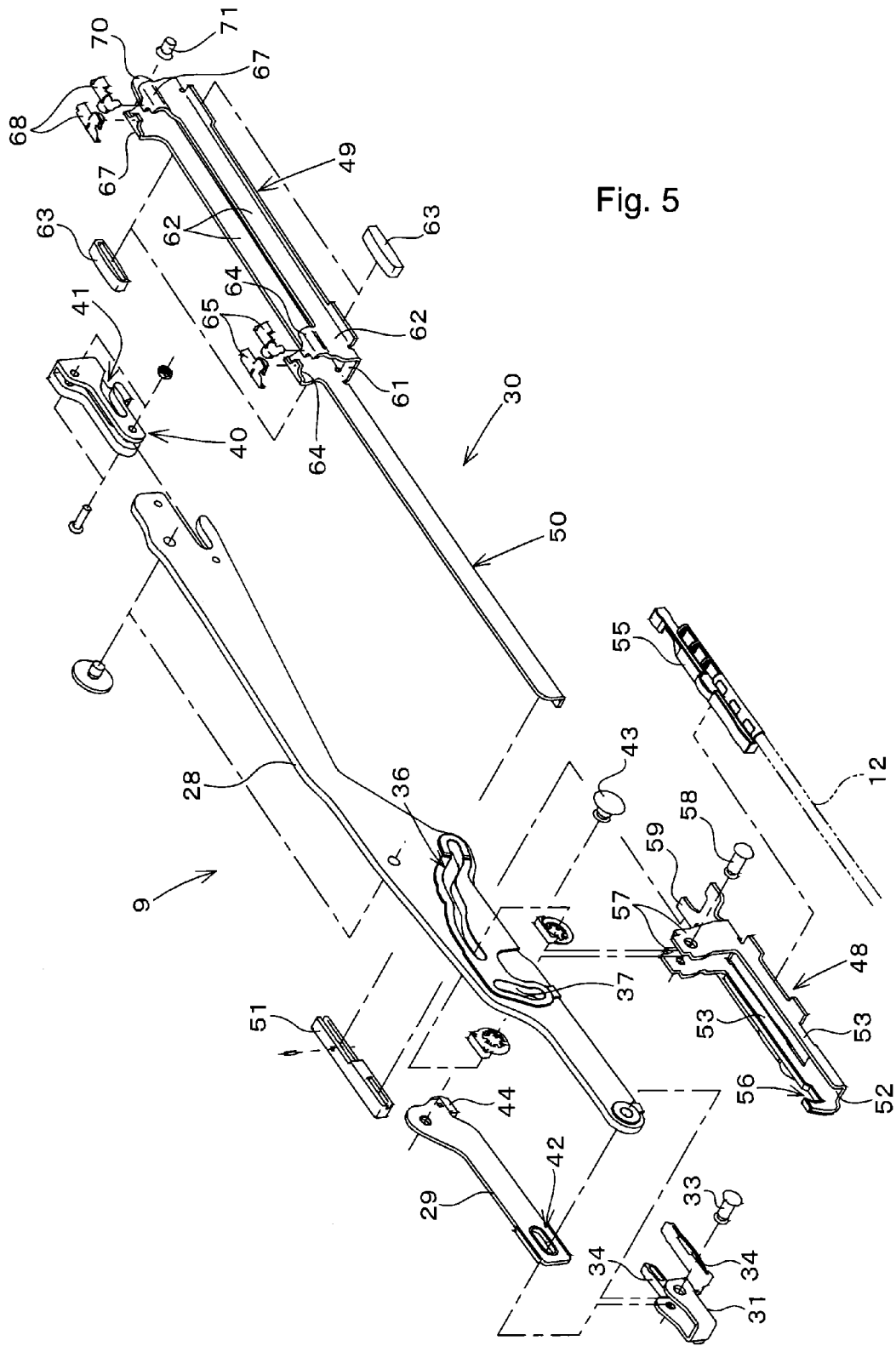
FIG. 5 is an exploded perspective view of a left side front panel actuator.
Figure 8:
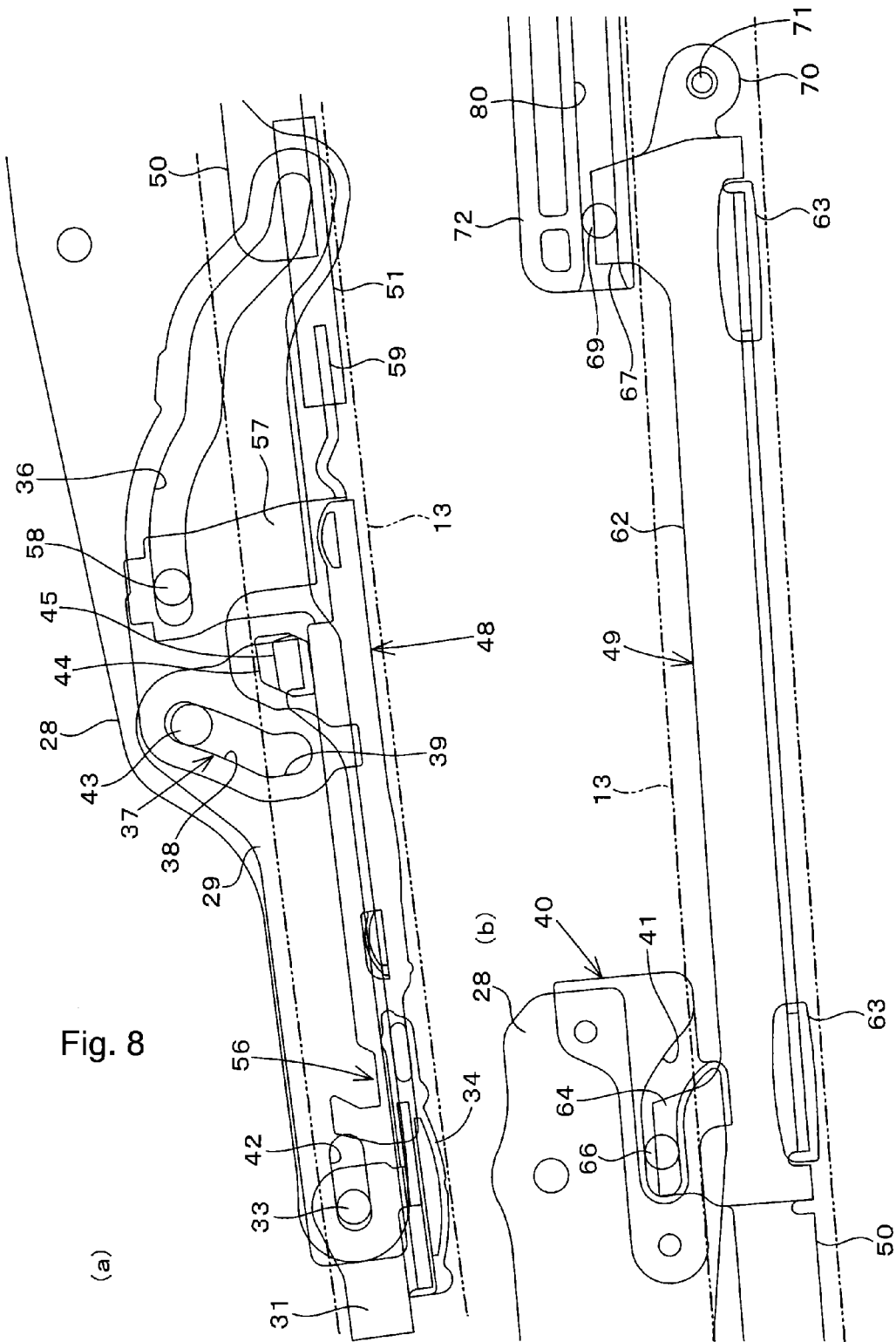
FIG. 8 (a) is a side view of a front portion of the front panel actuator in a fully closed state, and FIG. 8 (b) is a side view from a rear portion of a front lifter to a front portion of a rear lifter in a fully closed state.
Figure 9:
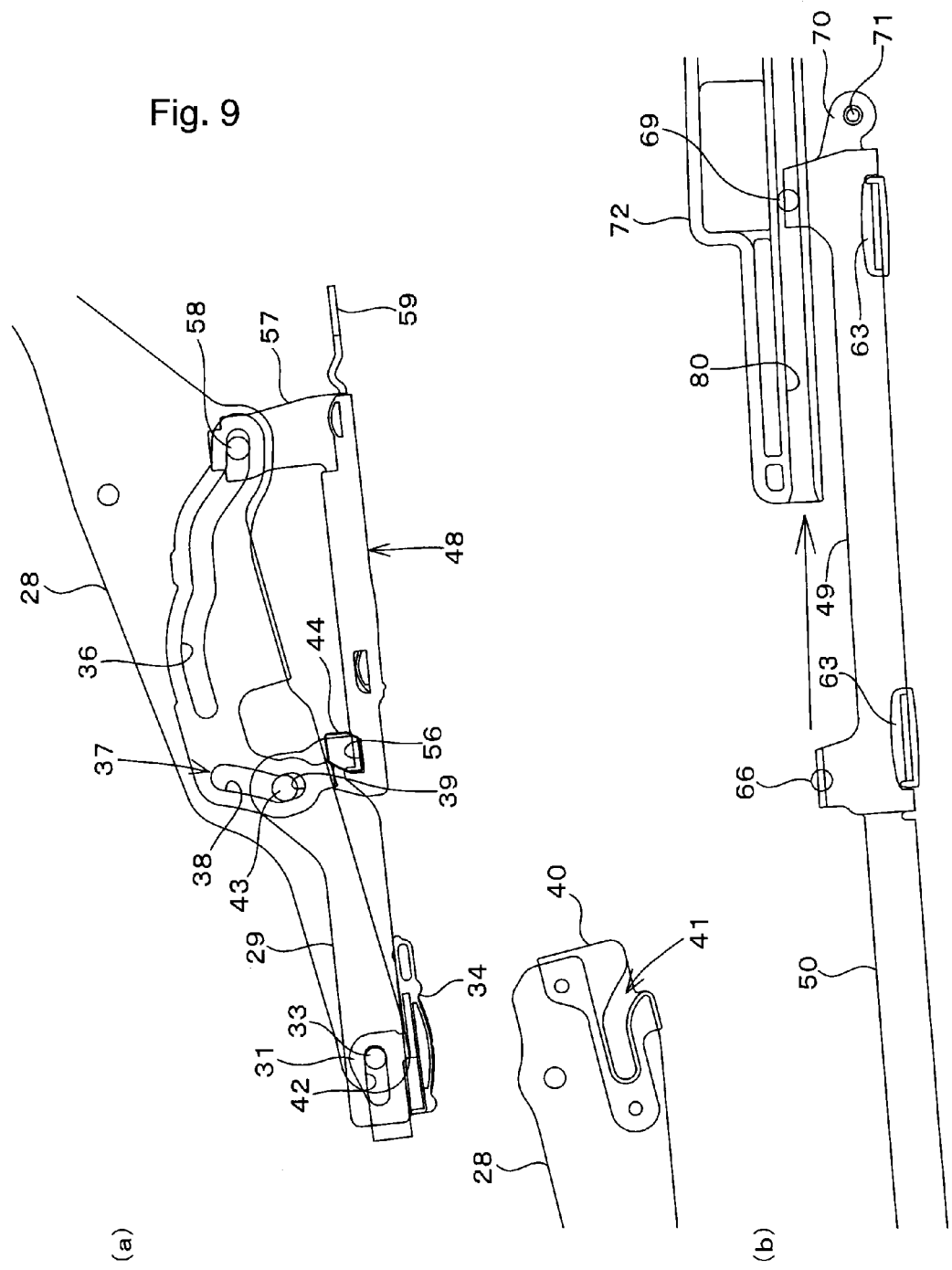
FIG. 9 (a) is a side view of a front portion of the front panel actuator in a fully tilted-up state, and FIG. 9 (b) is a side view from the rear portion of the front lifter to the front portion of the rear lifter in a fully tilted-up state.

As shown in FIGS. 4, 5 and 8, the front panel actuator 9 includes a front lifter 28, a timing arm 29 and a front slider 30.

The front lifter 28 is formed to have a length generally from the front edge portion of the front panel 6 to the rear portion thereof and it is located between the inward and outward slide guide grooves 23 of the panel guide portion 18 in a manner of being movable back and forth. As shown in FIG. 15, the front lifter 28 is attached to a side edge side in the lateral direction of the front panel 6 through an attachment bracket 31.

A front bracket 32 is pivotally coupled with the front end side of the front lifter 28 rotatably about a lateral axis through a pivotal shaft 33, and a slide shoe 34 longitudinally and slidably fitted to each of the inward and outward slide guide grooves 23 is attached to the front bracket 32.

Moreover, in the front side of the front lifter 28, there are formed a tilt guide groove 36 (cam groove) and a pin insertion groove 37 located in the front side of the tilt guide groove 36 in a manner of being laterally penetrating therethrough.

The tilt guide groove 36 is formed to be inclined to have a downward slope in a backward direction.

The pin insertion groove 37 is formed to have a rearward inclined groove 38 formed in a rearward inclined shape from an intermediate portion to an upper portion thereof and a downward groove 39 formed of the lower portion downwardly.

Further, a shutting cam 40 is attached to be fixed to the rear end side of the front lifter 28, and a pair of shutting cam grooves 41 is formed in the both right and left side surfaces of the shutting cam 40.

Each of the shutting cam grooves 41 is closed at the front edge thereof and the front portion thereof is in a straight line shape along the longitudinal direction of the guide rail 13 while the rear portion thereof is formed in an inclined shape having a downward slope backwardly, and the rear edge thereof is opened downwardly in a tilted backward direction.

The timing arm 29 is located inwardly in the lateral direction in the front side of the front lifter 28. In a front portion side of the timing arm 29, a shaft insertion hole 42 of a long elongated hole shape is formed to penetrate in the lateral direction along the longitudinal direction of the guide rail 13 so that the pivot shaft 33 is inserted through the shaft insertion hole 42 for pivotally coupling the front end side of the front lifter 28 with the front bracket 32.

In the upper portion of the rear portion of the timing arm 29, there is provided a pin 43 inserted to the pin insertion groove 37 of the front lifter 28 in a manner of being movable in the longitudinal direction.

Further, in the lower portion of the rear portion of the timing arm 29, there is provided an engagement protrusion 44 inwardly protruded in the lateral direction, and the engagement protrusion 44 is provided with a front timing member 45 inwardly protruded in the lateral direction.

Figure 10:
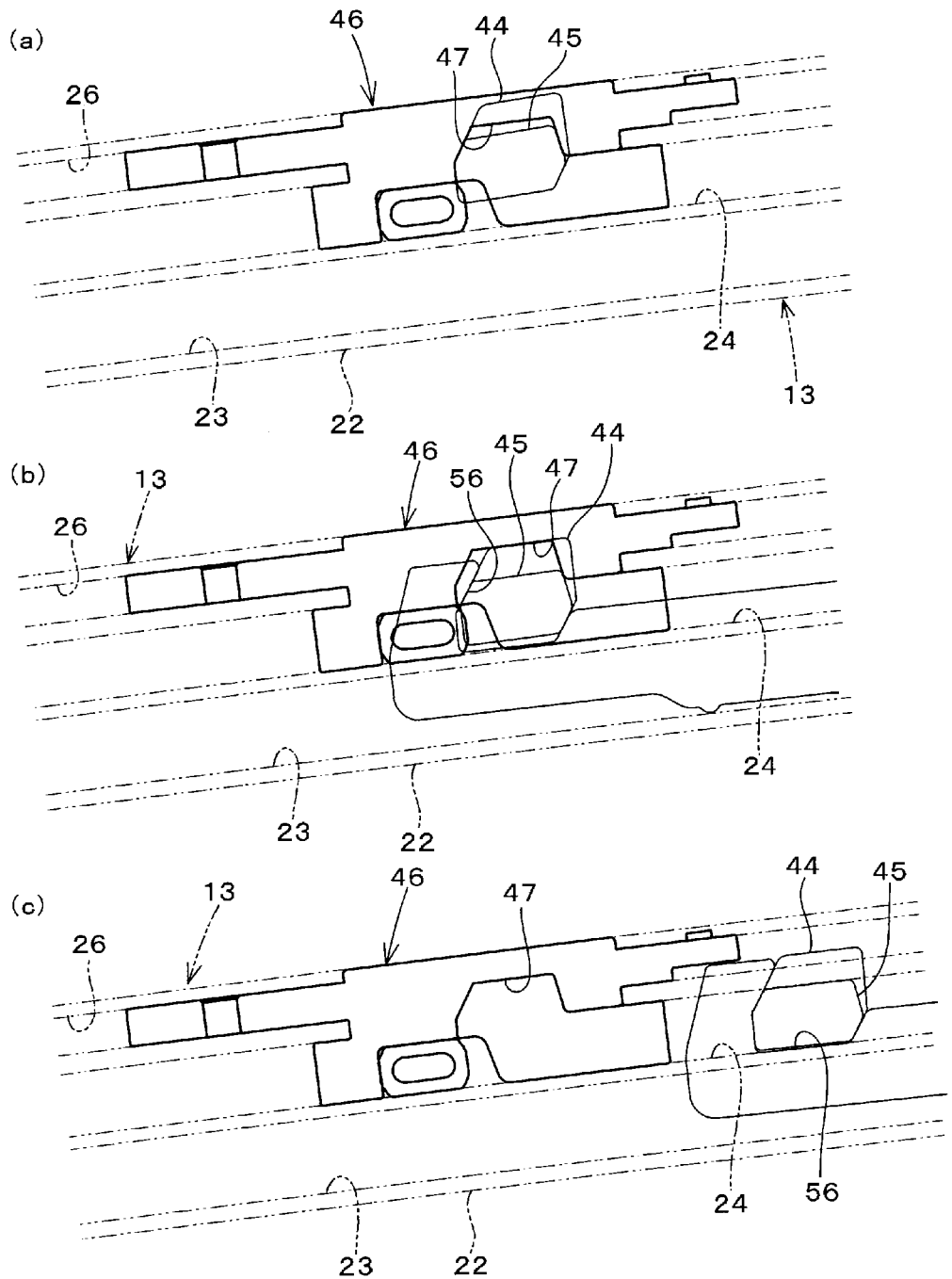
FIG. 10 is a side view showing an operation of a front timing member.

In the position of closing the front portion of the roof opening 4 by the front panel 6, a front locking member 46 is located for restricting a back-and-forth movement of the front lifter 28 by locking the front timing member 43 inwardly in the lateral direction of the timing arm 29. As shown in FIG. 10, the front locking member 46 is provided to be extending from the attachment groove 26 of the guide rail 13 to the timing guide groove 24 so that the upper side is fitted to the attachment groove 26 so as to be fixed tit the guide rail 13.

In the front locking member 46, there is formed an locking groove 47 in a shape of opening downward, i.e., toward the timing guide groove 24, and the front timing member 45 is allowed to be detachably fitted to the locking groove 47 from the lower side.

The front slider 30 is adapted to be back-and-forth movably (longitudinally movably) supported by the panel guide member 18 of the guide rail 13 so that it is moved back and forth to thereby drive the front panel actuator 9 so as to open and close the front panel 6 (i.e., to move the front panel 6 up and down and back and forth).

The front slider 30 includes mainly a forward slider 48, a backward slider 49 located rearward the forward slider 48, a joint piece 50 extending frontward from the backward slider 49, and a joint shoe 51 for jointing the joint piece 50 and the forward slider 48.

The forward slider 48 is located in the front downward side of the front lifter 28 and includes a bottom wall 52 and a pair of side walls 53 rising up from the both inward and outward sides in the lateral direction of the bottom wall 52.

In the lower edge of the inward side wall 53 of the frontward of the forward slider 48, there is provided a slide shoe 54 longitudinally slidably fitted to the inward slide guide groove 23, and the slide shoe 54 is slid within the slide guide groove 23 so that the forward slider 48 is made movable back and forth.

Also, in the lower edge of the outward side wall 53 of the forward slider 48, there is provided a cable fixture 55 movable in the longitudinal direction along the outward slide guide groove 23 and the cable guide groove 25, wherein the drive cable 12 is fixed to the cable fixture 55. Therefore, it is configured that the front slider 30 is moved back and forth by pushing and pulling the drive cable 12 in the longitudinal direction.

In the front portion of the inward side wall 53 of the forward slider 48, there is provided an engagement groove 56 engageable with the engagement protrusion 44 of the timing arm 29.

The rear portion of the forward slider 48 is provided with a pair of right and left extending pieces 57 extending upward from the inward and outward side walls 53 in a manner of sandwiching the front lifter 28, and as shown in FIG. 15, in the upper portion of the extending pieces 57, there is provided a tilt pin 58 (front forward supporting portion) that penetrates the right and left extending pieces 57 and is inserted through the tilt guide groove 36 of the front lifter 28.

A connecting piece 59 is provided on the rear end side of the forward slider 48.

The backward slider 49 includes a bottom wall 61 and a pair of side walls 62 rising up from both of inward and outward sides in the lateral direction of the bottom wall 61, wherein the joint piece 50 is extended frontward from the inward side wall 62 of the backward slider 49.

Under the lower edge of the inward and outward side walls 62 of the backward slider 49, there is provided a slide shoe 63 that is longitudinally slidably fitted to the inward and outward slide guide grooves 23 so that the backward slider 49 is allowed to be movable back and forth by sliding the slide shoe 63 within the slide guide grooves 23.

Figure 7:
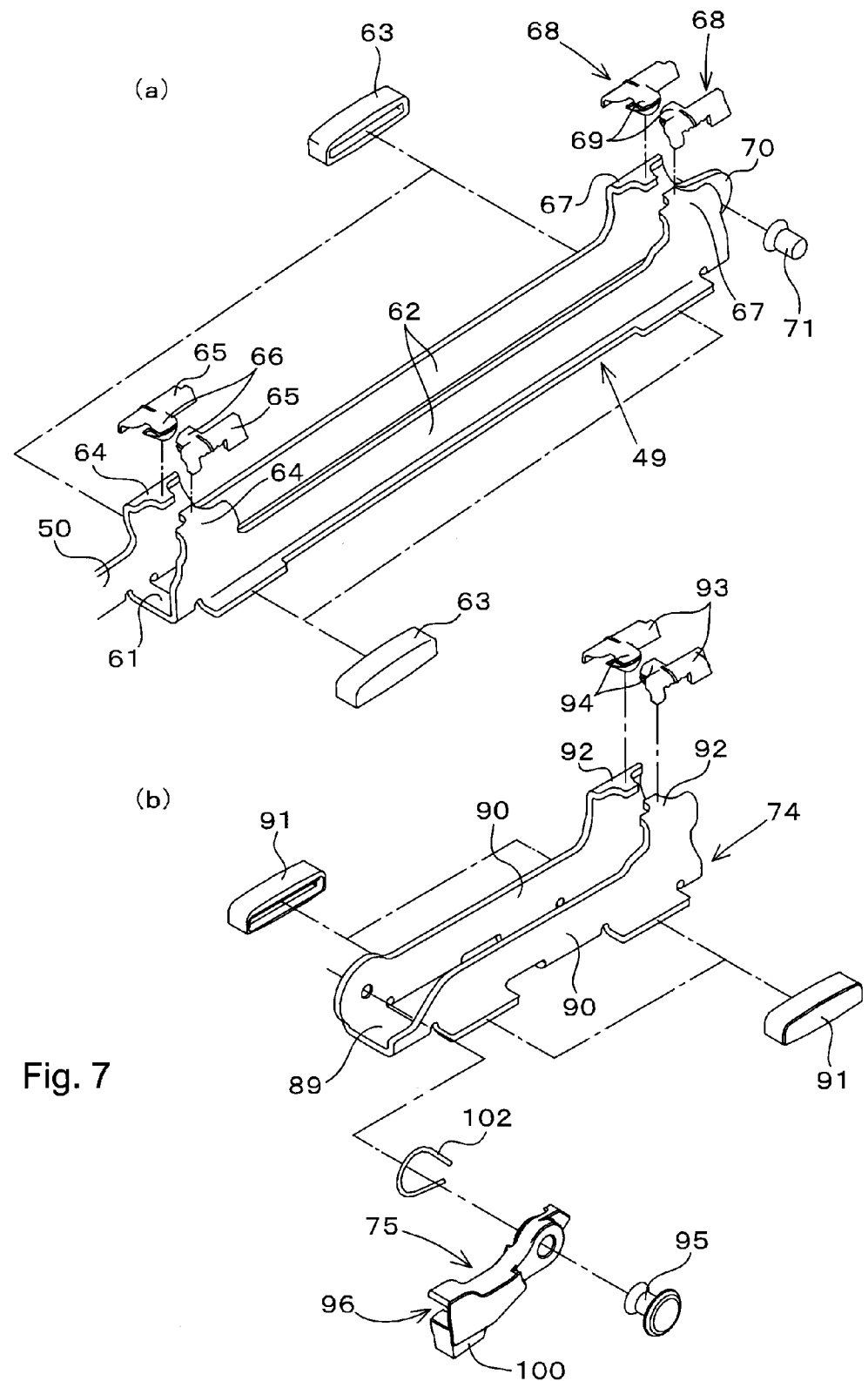
FIG. 7 (a) is an exploded perspective view of a back slider of a left side front slider, and FIG. 7 (b) is an exploded perspective view of a left side rear slider.

As shown in FIGS. 7 (*a*) and 15 (*b*), the front upper edges of the inward and outward side walls 62 of the backward slider 49 are provided with attachment pieces 64 extended toward the opposing sides and engagement shoes 65 are attached to the respective attachment pieces 64 and the engagement shoes 65 are located on both right and left sides of the shutting cam 40, and on the opposing sides of the engagement shoes, there are provided engagement portions 66 (front backward supporting portion) inserted to the shutting cam grooves 41 of the shutting cam 40.

In a fully closed state of closing the roof opening 4 by the front panel 6 and the rear panel 7, the rear end side of the backward slider 49 is positioned below a butt-joint between the front panel 6 and the rear panel 7, and as shown in FIGS. 7 (*a*) and 16 (*a*), the rear upper edges of the inward and outward side walls 62 of the backward slider 49 are provided with a pair of attachment pieces 67 extended toward the opposing side, and a pair of engagement shoes 68 is attached to the respective attachment pieces 67, and engagement portions 69 (rear forward supporting portions) are provided on the opposing sides of the paired engagement shoes 68.

The front and rear engagement portions 66 and 69 of the backward slider 49 are provided in the level in height.

Further, the rear edge of the inward side wall 62 of the backward slider 49 is provided with a coupling piece 70 extending backward, and the coupling piece 70 is provided with a coupling pin 71 (coupled portion) protruding outwardly in the lateral direction.

As shown in FIG. 15 (*a*), the joint shoe 51 is longitudinally slidably fitted to the inward slide guide groove 23 and the front portion thereof is coupled to the connecting piece 59 of the rear end side portion of the forward slider 48 and the rear portion thereof is coupled to the front portion of the joint piece 50.

Figure 6:
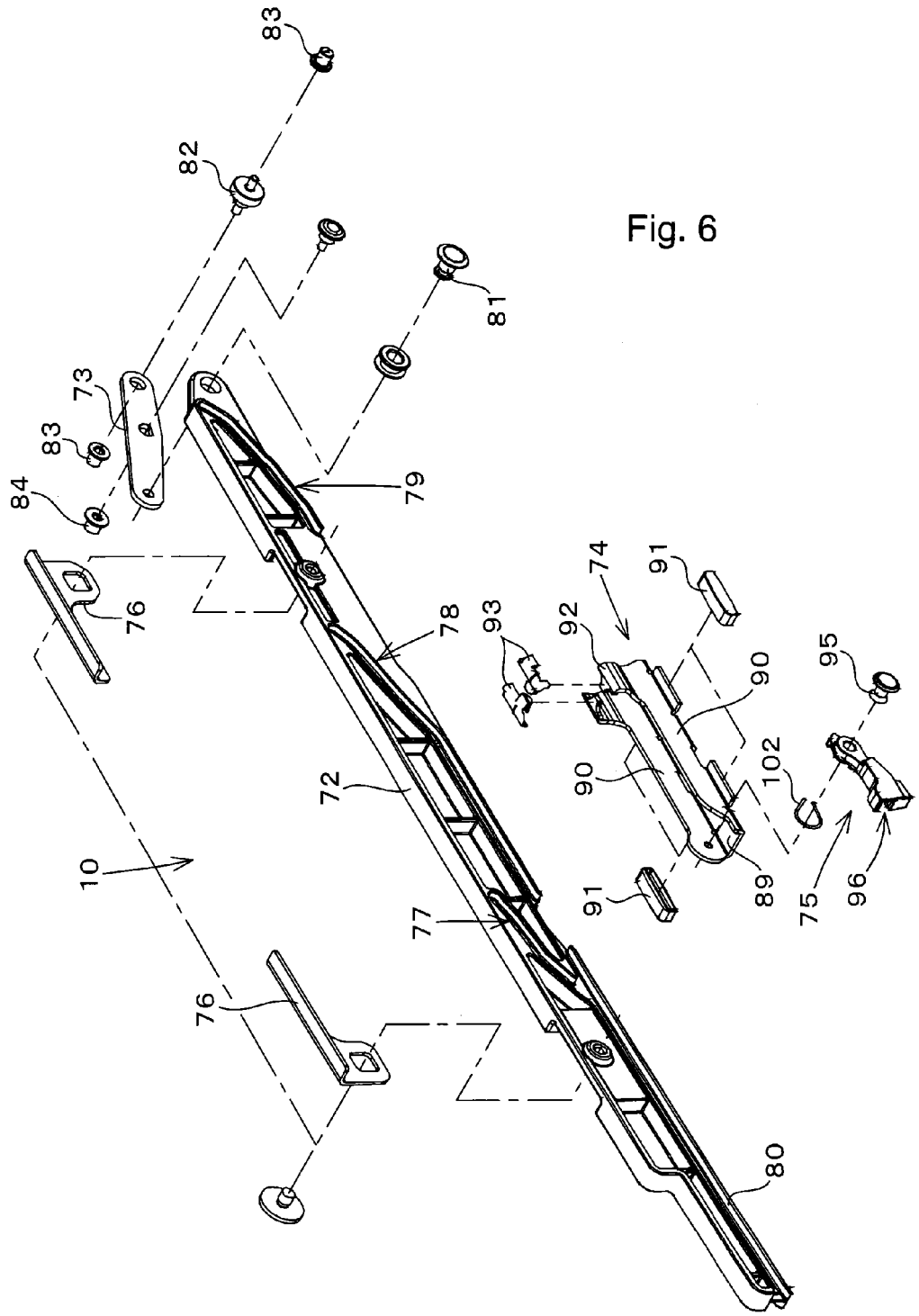
FIG. 6 is an exploded perspective view of a left side rear panel actuator.

As shown in FIGS. 4 and 6, the rear panel actuator 10 includes mainly a rear lifter 72, a timing link 73, a rear slider 74, a coupling arm 75 and the rear part of the front slider 30 (rear slider 49).

The rear lifter 72 is formed to have a length extending generally from the front edge to the generally rear edge of the rear panel 7, and as shown in FIG. 16 (*b*), the rear lifter 72 is located in a position above a space between the inward and outward slide guide grooves 23 of the panel guide portion 18 and it is attached to the side edge in the lateral direction of the rear panel 7 through an attachment bracket 76.

In the both inward and outward side surfaces in the lateral direction of the rear lifter 72, as shown in FIG. 4, one lift guide groove 77 (cam groove) is formed in the front side and a pair of front and rear lift guide grooves 78 and 79 (cam grooves) are formed in the rear side.

These lift guide grooves 77, 78 and 79 are formed to be inclined to have an upward slope in a backward direction.

The lift guide groove 77 in the front portion of the rear lifter 72 is referred to as a front lift guide groove and the forward rear lift guide groove 78 in the rear portion of the rear lifter 72 is referred to as a forward rear lift guide groove and the rear side lift guide groove 79 is referred to as a rear side rear lift guide groove.

Further, both in the laterally inward and outward side surfaces of the rear lifter 72, there are formed sliding grooves 80 extending from the front edge of the rear lifter 72 to the front edge of the forward rear lift guide groove 78 along the longitudinal direction of the guide rail 13.

The front edge of the sliding groove 80 is in an opened state frontward, and the intermediate portion thereof is contiguous to the front edge of the front lift guide groove 77, and the rear edge thereof is contiguous to the front edge of the forward rear lift guide groove 78.

Further, as shown in FIG. 16 (*a*), each of the engagement portions 69 of the engagement shoes 68 provided in the rear portion of the backward slider 49 of the front slider 30 is inserted to the sliding grooves 80 in a manner of being movable back-and-forth.

The timing link 73 is located in the rear side of the rear lifter 72 and the front end side thereof is pivotally coupled to the rear end side of the rear lifter 72 through a pivot 81 in a manner of being rotatable about the lateral axis.

In the rear end side of the timing link 73, as shown in FIGS. 6 and 17 (*d*), rollers 83 located on both laterally inward and outward sides are supported via a supporting member 82 in a manner of being rotatable about the lateral axis. The inward roller 83 is fitted to the timing guide groove 24 in a manner of being longitudinally movable, and the outward roller 83 is slidably abutted to a regulation wall 27 provided in the panel guide portion 18 of the guide rail 13.

As shown in FIGS. 6 and 17 (*c*), a rear timing member 84 is provided in the intermediate portion of the timing link 73. The rear timing member 84 is positioned in the laterally inward side of the timing link 73 and is allowed to be longitudinally movable in the timing guide groove 24.

In the position of closing the rear portion of the roof opening 4 by the rear panel 7, there is located a rear locking member 85 in the laterally inward side of the timing link 73 that regulates the back-and-forth movement of the rear lifter 72 by locking the rear timing member 84.

The rear locking member 85 is located below the rear edge of the roof opening 4.

Figure 13:
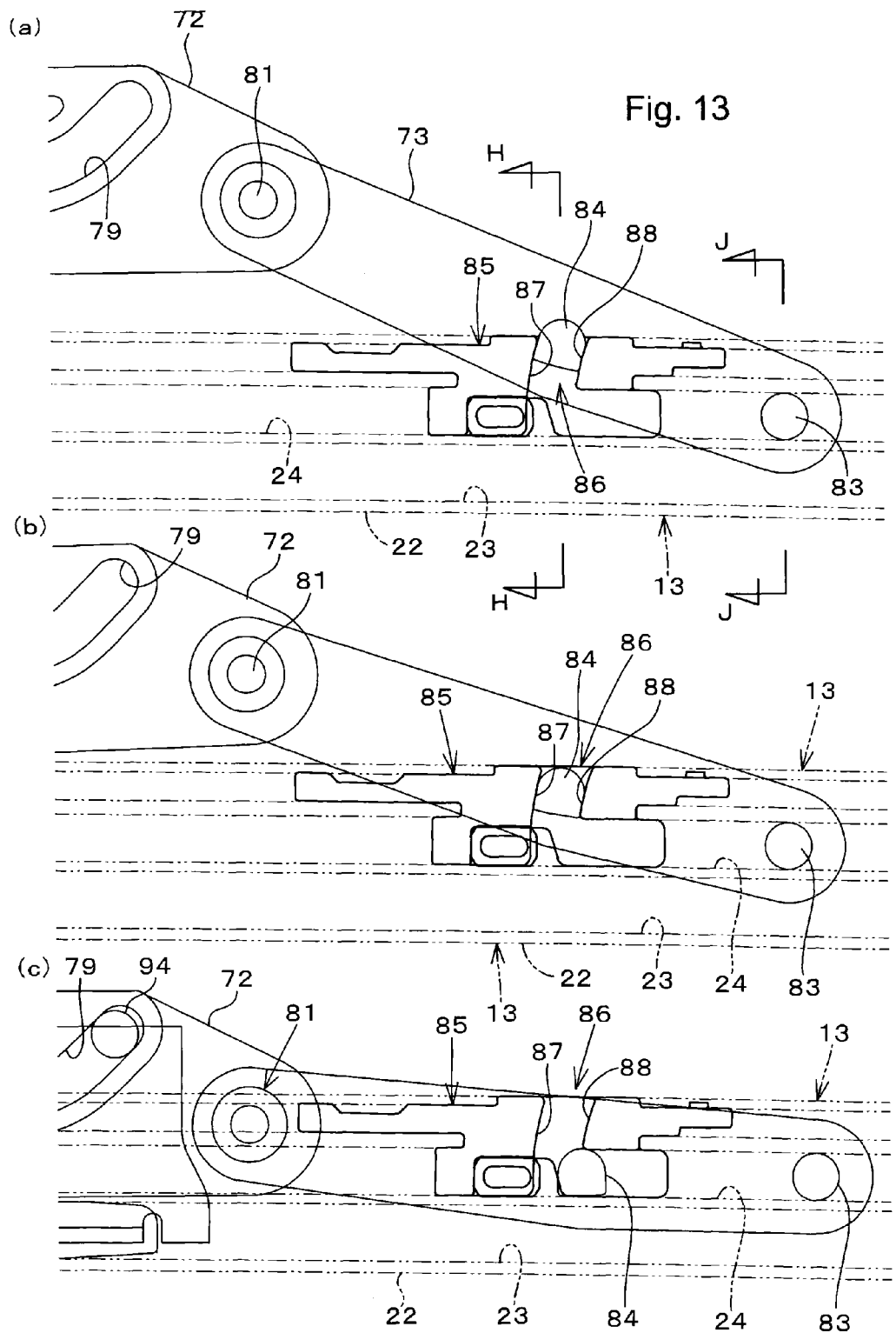
FIG. 13 is a side view showing an operation of the rear timing member.

As shown in FIG. 13, the rear locking member 85 is provided extendedly from the attachment groove 26 to the timing guide groove 24 on the guide rail 13 and the upper side thereof is fitted to the attachment groove 26 and fixed to the guide rail 13.

In the rear locking member 85, there is formed an actuate engagement groove 86 with a center of the roller 83 in the rear end of the timing link 73 as a pivotal fulcrum. The locking groove 86 is formed to have its upper edge opened upward and its lower edge of the front surface 87 contiguous to the bottom surface of the timing guide groove 24 and its lower edge of the rear surface 88 contiguous to the upper surface of the timing guide groove 24.

The rear slider 74 is located below the rear lifter 72 and is back-and-forth movably (longitudinally movably) supported by the panel guide portion 18 of the guide rail 13 so that, by moving back and forth, the rear panel actuator 10 is driven to perform the opening and closing operation of the rear panel 7 (to move the rear panel 7 up and down and back and forth).

The rear slider 74 is located in the rear portion of the rear lifter 72, and as shown in FIG. 7 (*b*), it includes a bottom wall 89 and a pair of side walls 90 rising up from both of the laterally inward and outward sides of the bottom wall 89.

Under the lower edges of the laterally inward and outward side walls 90 of the rear slider 74, there are provided slide shoes 91 longitudinally slidably fitted to the laterally inward and outward slide guide grooves 23 so that the slide shoes 91 are slid within the slide guide grooves 23 to thereby allow the rear slider 74 to be movable back and forth.

The rear upper edges of the inward and outward side walls 90 of the rear slider 74 are respectively provided with a pair of attachment pieces 92 extending toward the opposing sides, and a pair of engagement shoes 93 is attached to the respective attachment pieces 92. As shown in FIG. 17 (*a*), the engagement shoes 93 are located on both right and left sides of the backward rear lift guide groove 79, and on the opposing sides of the engagement shoes 93, there are provided engagement portions 94 (rear backward supporting portions) to be inserted to the rear lift guide grooves 79 in the rear side.

As shown in FIGS. 7 (*b*) and 12, in the front portion of the rear slider 74, the coupling arm 75 is provided so as to be coupled to the front slider 30. The rear portion of the coupling arm 75 is pivotally coupled to the inward side wall of the rear slider 74 by a pivot 95 in a manner of being rotatable about the lateral axis.

In the laterally inward side surface of the front portion of the coupling arm 75, there is formed a coupling cam groove 96 into which the coupling pin 71 in the rear edge of the front slider 30 is insertable.

The front end side of the coupling cam groove 96 is opened toward the front so as to be formed as an insertion opening 97 of the coupling pin 71, and the insertion opening 97 is formed to be widely opened toward the front.

The rear portion of the coupling cam groove 96 is formed to be an inclined groove 98 with a downward slope toward the rear and the rear edge of the inclined groove 98 is closed. An intermediate portion between the insertion opening 97 and the inclined groove 98 is formed to be a transverse groove 99 along the longitudinal direction of the guide rail 13.

A stopper 100 is protruded downward under the lower surface of the coupling arm 75.

As shown in FIGS. 12 and 17 (*b*), in the bottom wall 22 of the guide rail 13, there is formed a vertically penetrating locking hole 101 (arm locking portion) in which the stopper 100 of the coupling arm 75 is detachably engaged so that the stopper 100 is engaged in the locking hole 101 to thereby regulate the back-and-forth movement of the rear slider 74.

A U-character shaped spring 102 is provided between the rear slider 74 and the coupling arm 75 for biasing the coupling arm 75 downward about the pivot 33 (see FIG. 7 (*b*)).

In the sunroof apparatus 2 configured described above, from the fully closed state of the roof opening 4 being closed by the front panel 6 and the rear panel 7 shown in FIG. 2 (*a*), the front panel 6 is tilted up so as to be in a fully tilted-up state in such a manner that the rear portion of the front panel 6 is lifted up (as is inclined in a rearward inclined state) in the generally same position (in the front position of the roof opening 4) in the longitudinal direction shown in FIG. 2 (*b*). Then, the front panel 6 is moved backward in the tilted-up state so that the rear portion of the front panel 6 overlaps above the front portion of the rear panel 7 so as to render the front portion of the roof opening 4 to be generally half-opened as shown in FIG. 3 (*a*). Meanwhile, the rear panel 7 remains still in a state of closing the rear portion of the roof opening 4.

Next, as shown in FIG. 3 (*b*), after the front portion of the rear panel 7 is first lowered (lifted down) largely compared to the rear portion, the rear portion of the rear panel 7 is largely lowered compared to the front portion so that the rear panel 7 is in a lift-down completion state as shown in FIG. 3 (*c*).

Then, in the fully tilted-up state of the front panel 6 and in the lift-down completion state of the rear panel 7, the front panel 6 and the rear panel 7 are moved backward so that the state becomes a fully opened state in which the rear panel 7 is accommodated below the rear portion of the roof 3 while the rear portion of the front panel 6 is overlapped above the rear portion of the roof 3.

The following describes in detail the operation of opening and closing the panels.

In the fully closed state shown in FIG. 2 (*a*), the pivot 33 pivotally supporting the front end side of the front lifter 28 is positioned in the front end side of the shaft insertion hole 42 formed in the timing arm 29, and the pin 43 provided above the rear portion of the timing arm 29 is positioned in the upper edge side of the pin insertion groove 37 formed in the front lifter 28, and the tilt pin 58 located in the rear upper portion of the forward slider 48 of the front slider 30 is positioned in the front end side of the tilt guide groove 36 formed in the front lifter 28, and the engagement portion 66 of the engagement shoe 65 in the front portion of the backward slider 49 of the front slider 30 is positioned in the front portion of the shutting cam groove 41 of the shutting cam 40.

The front portion of the front lifter 28 is supported by the pivot 33 and tilt pin 58, and the rear portion thereof is supported by the backward slider 49 and engagement portion 66.

The engagement portion 66 of the engagement shoe 65 in the front portion of the backward slider 49 is engaged with the shutting cam groove 41 of the shutting cam 40 so as to regulate the rear portion of the front panel 6 from being lifted up. Further, the rear portion of the front panel 6 is supported by the engagement portion 66 in the front portion of the backward slider 49 in a state that the front portion of the roof opening 4 is closed by the front panel 6.

Further, as shown in FIG. 10 (*a*), the front timing member 45 is fitted to the locking groove 47 of the front locking member 46 so that the back and forth movement of the front lifter 28 is regulated. Then, since the pin 43 in the rear upper portion of the timing arm 29 is located in the rear inclined groove 38 of the pin insertion groove 37 of the front lifter 28, the front timing arm 29 is regulated from downward swinging. Thus, it is configured that the front timing member 45 is prevented from being disengaged downward from the locking groove 47.

Further, the engagement groove 56 of the forward slider 48 is located in the front portion of the engagement protrusion 44.

In addition, the engagement portion 69 of the engagement shoe 68 of the backward slider 49 is located in the front end side (front portion) of a slide groove 80 of a rear lifter 72 (i.e., the engagement portion 69 of the engagement shoe 68 of the backward slider 49 is located in the front end side of the rear lifter 72) so as to support the front end sides (front portions) of the rear lifter 72 and the rear panel 7 by the rear portion of the backward slider 49.

Further, the rear slider 74 is located in the rear portion of the rear lifter 72, and an engagement portion 94 of an engagement shoe 93 in the rear portion of the rear slider 74 is located in the front side of the backward rear lift guide groove 79 of the rear lifter 72 so as to support the rear portions of the rear lifter 72 and the rear panel 7 by the rear portion of the rear slider 74.

In the conventional sunroof apparatus, the sliders for supporting the front and rear panels are independently provided for the front and rear panels, respectively. Whereas, in the sunroof apparatus 2 of the present embodiment, it is structured that the front portion of the rear panel 7 is supported by the rear portion of the front slider 30 and the rear portion of the rear panel 7 is supported by the rear slider 74.

Thus, in a fully closed state, there can be obtained a possibly wide distance between the engagement portion 69 (rear forward supporting portion) supporting the front portion of the rear panel 7 and the engagement portion 94 (rear backward supporting portion) supporting the rear portion of the rear panel 7 so that the stiffness of holding the rear panel 7 can be improved.

Moreover, the stopper 100 of the coupling arm 75 pivotally coupling to the front portion of the rear slider 74 is inserted to the locking hole 101 so as to regulate the back-and-forth movement of the rear slider 74.

Also, as shown in FIG. 13 (*a*), the timing link 73 is in a frontward inclined shape and the rear timing member 84 is located above the locking groove 86 of the rear locking member 85 so as to regulate the back-and-forth movement of the rear lifter 72.

When the front slider 30 is moved backward from the fully closed state of the front panel 6 and rear panel 7, the tilt pin 58 in the rear upper portion of the forward slider 48 moves backward along the tilt guide groove 36 of the front lifter 28 and the engagement portion 66 in the front portion of the backward slider 49 moves backward along the shutting cam groove 41 of the shutting cam 40.

Then, the engagement portion 66 in the front portion of the backward slider 49 is disengaged from the shutting cam groove 41 and the rear portions of the front lifter 28 and the front panel 6 are lifted up about the pivot 33 as a pivotal center (i.e., tilted up). At this time, the pivot 33 in the front end side of the front lifter 28 moves backward within the shaft insertion hole 42 so that the pin 43 in the rear upper portion of the timing arm 29 moves downward within the rearward inclined groove 38 of the pin insertion groove 37.

Subsequently, when the tilt pin 58 in the rear upper portion of the forward slider 48 moves toward the rear end side of the tilt guide groove 36, the front panel 6 becomes in a fully tilted-up state as shown in FIGS. 2 (*b*) and 9.

In this fully tilted-up state, the pivot 33 in the front end side of the front lifter 28 is positioned in the rear end side of the shaft insertion hole 42. Also, the pin 43 in the rear upper portion of the timing arm 29 is positioned in the upper edge side of the downward groove 39 of the pin insertion groove 37 so that the timing arm 29 becomes downward swingable about the pivot 33 as a fulcrum, and the engagement groove 56 of the forward slider 48 is engaged with the engagement protrusion 44 of the timing arm 29 so as to pull down the timing arm 29 as shown in FIG. 10 (*b*). Thus, the front timing member 45 is disengaged downward from the locking groove 47 of the front locking member 46 and the front timing member 45 becomes movable backward along the timing guide groove 24.

When the front slider 30 is moved forward from the fully tilted-up state, the front timing member 45 is abutted to the front lower edge side of the locking groove 47 of the front locking member 46 so that the forward movement of the front timing member 45 is regulated and the engagement protrusion 44 is pressed to the rear surface of the engagement groove 56 so as to be pushed up, whereby the front timing member 45 is fitted into the locking groove 47.

Then, the rear portions of the front lifter 28 and front panel 6 are lowered by an operation reverse to that mentioned above so as to return to the closed position where the front panel 6 closes the front portion of the roof opening 4.

Thus, the front locking member 46 including the locking groove 47, the timing arm 29, the engagement protrusion 44 and front timing member 45 provided in the timing arm 29, the engagement groove 56 of the forward slider 48 and the like constitute a front timing mechanism that regulates the back-and-forth movement of the front panel 6 during the tilt operation of the front panel 6 and that releases the back-and-forth movement of the front panel 6 in the fully tilted-up state of the front panel 6.

Meanwhile, when the front slider 30 is further moved backward from the fully tilted-up state, the front panel 6 moves backward together with the front lifter 28 and the timing arm 29 remaining in the fully tilted-up state.

At this time, as shown in FIG. 10 (*c*), the front timing member 45 moves backward within the timing guide groove 24. In addition, within the timing guide groove 24, there exists no obstacle preventing the backward movement of the front timing member 45 until reaching to the rear locking member 85.

Also, when the front slider 30 moves backward, since the engagement portion 69 in the rear portion of the backward slider 49 of the front slider 30 moves backward in the slide groove 80 of the rear lifter 72, the part (engagement portion 69) supporting the front portion of the rear lifter 72 is shifted backward so that the supporting space for the rear lifter 72 becomes narrow. However, the engagement portion 66 of the engagement shoe 65 in the front portion of the backward slider 49 is inserted into the slide groove 80 in the way from the front end side.

Then, since the front portion of the rear lifter 72 is supported by the engagement portion 66 in the front portion of the backward slider 49, the rear lifter 72 (rear panel 7) can be supported in a wide supporting space all the time. Moreover, after the engagement portion 66 in the front portion of the backward slider 49 is inserted to the slide groove 80 of the rear lifter 72, the rear panel 7 can be supported by three points of the engagement portion 66 in the front portion of the backward slider 49, the engagement portion 69 in the rear portion of the backward slider 49 and the engagement portion 94 of the rear slider 74 so as to be able to improve the supporting stiffness.

In the case where the front panel 6 is moved backward remaining in the fully tilted-up state, the rear portion of the front panel 6 overlaps the front portion of the rear panel 7 and the front slider 30 is coupled to the rear slider 74.

In FIGS. 2 and 3, the rear panel 7 shown by a solid line shows a cross section of the central portion in the lateral direction and the central portions in the lateral direction of the front panel 6 and rear panel 7 are shown in a middle high state. Therefore, since the side portions in the lateral direction of the rear panel 7 is positioned in height shown by a phantom line X in FIG. 3, the rear portion of the front lifter 28 is kept from contacting the rear panel 7.

Figure 11:
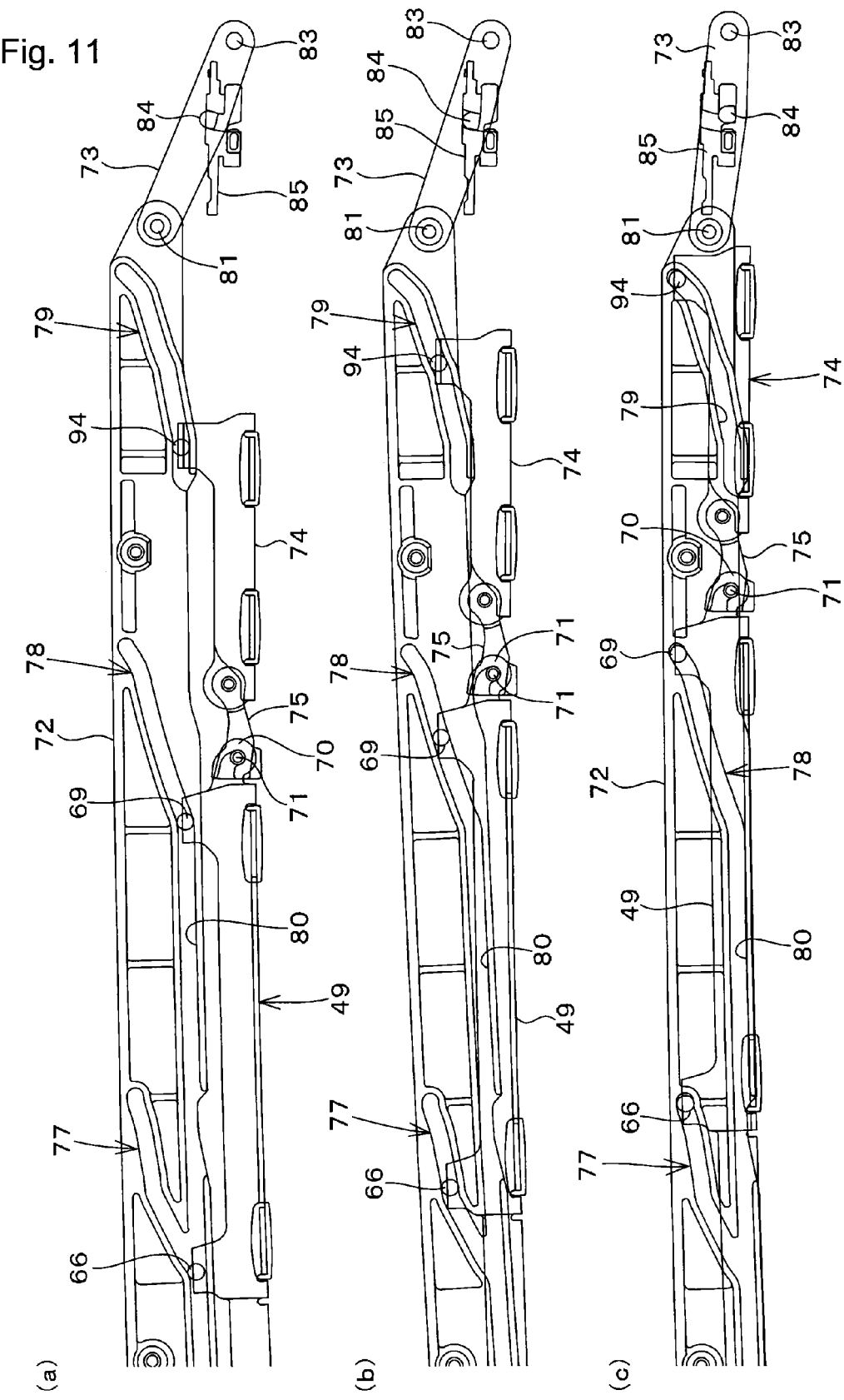
FIG. 11 is a side view showing a descending operation of the rear lifter.

FIGS. 3 and 11 (a) show a completion state of coupling the front slider 30 and the rear slider 74. The coupling operation and coupling release operation between the front slider 30 and the rear slider 74 are described referring to FIG. 12.

As shown in FIG. 12 (a), in a state that the stopper 100 of the coupling arm 75 provided in the front side of the rear slider 74 is inserted to the locking hole 101, the coupling pin 71 in the rear edge of the front slider 30 is positioned in the same height as the insertion port 97 of the coupling cam groove 96 of the coupling arm 75 so that the coupling pin 71 can be inserted to the coupling cam groove 96.

When the front slider 30 is moved backward from the state shown in FIG. 12 (a), the coupling pin 71 is inserted to the coupling cam groove 96 and the coupling pin 71 pushes the rear surface of the inclined groove 98. Then, as shown in FIG. 12 (b), the coupling arm 75 is pushed upward so that the stopper 100 is disengaged from the locking hole 101 and the coupling between the coupling pin 71 and the coupling arm 75 is completed.

Then, in the case where the stopper 100 is disengaged from the locking hole 101, the stopper 100 is slid backward on the bottom wall 22 of the guide rail 13 as shown in FIG. 12 (c), whereby the front slider 30 is pushed and the rear slider 74 is moved backward.

Also, when the front slider 30 and the rear slider 74 are moved forward, since the coupling state between the coupling pin 71 and the coupling arm 75 is not released unless the coupling arm 75 is swung downward, the coupling arm 75 is pulled forward by the coupling pin 71 so that the rear slider 74 together with the front slider 30 is moved forward.

And when the stopper 100 of the coupling arm 75 is positioned above the locking hole 101 while the rear slider 74 together with the front slider 30 is moved forward, the coupling arm 75 is moved downward by the self weight and a biasing force of a spring 102 so that the stopper 100 is fitted to the locking hole 101.

When the stopper 100 is fitted to the locking hole 101, the coupling pin 71 reaches the upper edge side of the inclined groove 98 of the coupling cam groove 96 and moves forward across a transverse groove portion 99 so as to be disengaged forward from the coupling cam groove 96 so that the coupling between the coupling pin 71 and the coupling arm 75 is released.

In the case where the coupling between the coupling pin 71 and the coupling arm 75 is released, although the coupling arm 75 may be fitted to the locking hole 101 only by the self weight, the stopper 100 is rendered to be fitted to the locking hole 101 also by the biasing force of the spring 102 as in the present embodiment, whereby a malfunction of the coupling arm 75 can be prevented so as to achieve an effect that the stopper 100 is surely fitted to the locking hole 101.

In the coupling completion state between the front slider 30 and the rear slider 74 shown in FIGS. 3 (a) and 11 (a), the engagement portion 69 in the rear portion of the backward slider 49 of the front slider 30 is positioned in the front end side of the rear lift guide groove 78 in the front side, and the engagement portion 66 in the front portion of the backward slider 49 of the front slider 30 is positioned in the front end side of the front lift guide groove 77.

When the front slider 30 is moved backward to a coupling position to the rear slider 74, the engagement portion 69 in the rear portion of backward slider 49 of the front slider 30 does not enter the front lift guide groove 77 but passes through the front lift guide groove 77 and reaches the forward rear lift guide groove 78. However, when the engagement portion 66 in the front portion of the backward slider 49 of the front slider 30 reaches the front lift guide groove 77, since the engagement portion 69 in the rear portion of the backward slider 49 is inserted to the front end side of the rear lift guide groove 78 in the front side so as to slightly pull down the rear lifter 72, the engagement portion 66 in the front portion of the backward slider 49 can be inserted into the rear lift guide groove 78 in the front side.

When the front slider 30 is moved backward from the coupling completion state shown in FIGS. 3 (a) and 11 (a), the rear slider 74 is pushed by the front slider 30 and moved backward so that the rear lifter 72 and the rear panel 7 are lowered (lifted down).

The lowering operation of the rear lifter 72 is described below referring to FIGS. 3 and 11.

In the case where the front slider 30 and the rear slider 74 are moved backward from the coupling completion state so that the respective engagement portions 66, 69 and 94 provided in the respective sliders 30 and 74 are moved to midways of the respective lift guide grooves 77, 78 and 79 as shown in FIGS. 3 (b) and 11 (b), since the inclination angle of the front portion of the forward lift guide groove 77 is larger than the respective inclination angles of the front portions of the forward rear lift guide groove 78 and backward rear lift guide groove 79 and further since the inclination angle of the front portion of the forward rear lift guide groove 78 is larger than the inclination angle of the front portion of the backward rear lift guide groove 79, the front portion of the rear lifter 72 (rear panel 7) is first largely lowered (lifted down) compared to the rear portion thereof.

Subsequently, when the front slider 30 and the rear slider 74 are further moved backward so that the respective engagement portions 66, 69 and 94 provided in the respective sliders 30 and 74 are moved to the rear end sides of the respective lift guide grooves 77, 78 and 79 as shown in FIGS. 3(c) and 11(c), since the inclination of the rear portion of the forward lift guide groove 77 is more moderate than the inclinations of the rear portions of the forward rear lift guide groove 78 and the backward rear lift guide groove 79 and the inclinations of the rear half portions of the rear portions of the forward rear lift guide groove 78 and the backward rear lift guide groove 79 are steeper than those of the front half portions, the rear portion of the rear lifter 72 (rear panel 7) is largely lowered (lifted down) compared to the front portion thereof.

Thus, the rear panel 7 is positioned lower in height than the roof 3 so that it becomes possible to accommodate the rear panel 7 below the rear portion of the roof 3.

Meanwhile, since the rear timing member 84 remains to be fitted in the locking groove 86 of the rear locking member 85 until the lowering operation of the rear lifter 72 is completed, the backward movement of the rear lifter 72 is regulated.

The movement regulating operation of the rear lifter 72 is described referring to FIG. 13. In a state before the rear lifter 72 is operated to be lowered, the timing link 73 is held in a forward inclined state and the rear timing member 84 is positioned on the locking groove 86 of the rear locking member 85 so that the back-and-forth movement of the rear lifter 72 is regulated as shown in FIG. 13 (*a*).

As shown in FIG. 13 (*b*), as the rear lifter 72 is lowered, the timing link 73 swings downward about the rearmost roller 83 as a pivotal center and also the rear timing member 84 accordingly moves downward within the locking groove 86 so as to gradually get into the timing guide groove 24.

Then, in the lifted-down completion state of the rear lifter 72, the rear timing member 84 gets into the timing guide groove 24 so that the rear timing member 84 can be moved backward within the timing guide groove 24. Thus, the regulation of the backward movement of the rear lifter 72 is released so that the front panel 6 and the rear panel 7 can be moved backward.

Further, in the case where the front slider 30 and the rear slider 74 are moved forward from this state, the rear timing member 84 is moved forward and abutted to a lower portion of the front surface 87 of the locking groove 86 of the rear locking member 85 so that the forward movement of the rear timing member 84 is regulated so as to regulate the forward movement of the rear lifter 72.

Thereafter, the rear lifter 72 and the rear panel 7 are raised by a reverse operation thereto so that the rear panel 7 returns back to the closing position of closing the rear portion of the roof opening 4.

By the timing link 73, the rear timing member 84 provided in the timing link 73, the rear locking member 85 including the locking groove 86 and so forth, there is constructed a rear timing mechanism that regulates the back-and-forth movement of the rear panel 7 during the lifting operation of the rear panel 7 and that releases the regulation of the back-and-forth movement of the rear panel 7 in the lifted-down completion state of the rear panel 7.

Meanwhile, in the lifted-down completion state of the rear panel 7 shown in FIGS. 3 (*c*) and 11 (*c*), in the case where the front slider 30 and the rear slider 74 are further moved backward, the front panel 6 is tilted up and the rear panel 7 is moved backward in the lifted-down state so that the rear portion of the front panel 6 overlaps above the rear portion of the roof 3 so as to become the fully opened state in which the whole of the rear panel 7 is accommodated below the rear portion of the roof 3 and the roof opening 4 is largely opened.

In this fully opened state, the rear locking member 85 is not seen from the outside so that the appearance can be improved (it appears that there exists only the front locking member 46).

Moreover, in the fully opened state, the front timing member 45 is positioned in the frontward of the rear locking member 85.

In the present embodiment, it is constructed that the front timing member 45 is moved back and forth in the forward side of the rear locking member 85 in the timing guide groove 24 and the rear timing member 84 is moved back and forth in the backward side of the rear locking member 85 in the timing guide groove 24. In other words, it is constructed that the front timing member 45 and the rear timing member 84 are moved back and forth in the common timing guide groove 24. Moreover, in order to regulate the back-and-forth movement of the rear slider 74, it is constructed that the stopper 100 of the coupling arm 75 is fitted into the locking hole 101 provided in the bottom wall 22 of the guide rail 13. Thus, in the sunroof apparatus 2 of the present embodiment, the size of the guide rail 13 can be reduced in cross section (simplification of the guide rail 13) and layout performance of the guide rail 13 can be improved with reduction in weight.

Since the slider coupling mechanism interlocking between the front slider 30 and the rear slider 74 includes the coupling arm 75 provided in the rear slider 74, the coupling cam groove 96 formed in the coupling arm 75, the coupling pin 71 provided in the front slider 30, the stopper 100 provided in the coupling arm 75 and the locking hole 101 formed in the bottom wall 22 of the guide rail 13, the slider coupling mechanism can be constructed as a simple and compact mechanism with reduction of the number of parts.

Moreover, in the conventional slider coupling mechanism interlocking between the front slider and the rear slider, the structure of regulating the back-and-forth movement of the rear slider is constructed such that the coupling arm is provided in the front portion of the rear slider and the arm locking member of located in the side of the coupling arm and the coupling pin provided at the tip end of the coupling arm is locked in the locking groove formed in the arm locking member, wherein the arm locking member is provided in the opposing side of one of the right and left side walls extended upward from the bottom wall of the guide rail. Therefore, the arm locking member affects the total thickness of the guide rail in the vertical direction. In contrast, according to the present embodiment, it is structured that the stopper 100 provided in the coupling arm 75 is fitted to the locking hole 101 formed in the bottom wall 22 of the guide rail 13 so that the back-and-forth movement of the rear slider 74 is regulated. Therefore, this structure does not affect the total thickness of the guide rail 13 and is made compact so that it can be located between the laterally inward and outward slide guide grooves 23 and in a narrow space below the rear lifter 72.

Moreover, in the sunroof apparatus 2 of the present embodiment, the engagement portion 66 in the front portion of the backward slider 49 has a function (shutting function) of preventing the rear portion of the front panel 6 from floating up in the state that the front panel 6 closes the front portion of the roof opening 4, a function of supporting the front portion of the rear panel 6 and a function of pulling down the front portion of the rear panel 6 so that the sharing of the members can be achieved.

Further, since the shutting structure of the front panel of the present embodiment is adapted to have a structure that the engagement portion 66 in the front portion of the backward slider 49 in the case where the front slider 30 is engaged in the shutting cam groove 41 in the rear end side of the front lifter 28, the construction of parts can be simplified.

Also, in the present embodiment, although the coupling cam groove 96 is formed in the coupling arm 75 provided in the front portion of the rear slider 74 and the coupling pin 71 is provided in the coupling piece 70 in the rear edge of the front slider 30, it may be possible that the coupling pin 71 is provided in the coupling arm 75 so that the coupling pin 71 is fitted to the coupling piece 70 so as to form the coupling cam groove for swinging the coupling arm 75 upward.

In addition, the swinging direction of the coupling arm 75 may be in the lateral direction. And the locking hole 101 may not be formed in the bottom wall 22 and it is sufficient that the locking hole 101 is formed in the guide rail 13 per se.

In addition, the present invention should not be limited to the sunroof apparatus 2 of the present embodiment and may be also applied to a sunroof apparatus adapted to have a construction that, after the rear portion of the rear lifter is lowered in advance, the front portion thereof is lowered, as the conventional sunroof apparatus.

The invention claimed is:

1. A sunroof apparatus including a front panel retractably opening/closing a front portion of a roof opening formed in a roof of a vehicle and a rear panel retractably opening/closing a rear portion of said roof opening (4), the sunroof apparatus comprising:

a front slider actuating the front panel by moving back and forth; a rear slider actuating the rear panel by moving back and forth; and a guide rail guiding the front slider and the rear slider in a manner of being movable back and forth, wherein the front slider is moved backward so as to be coupled to the rear slider, whereby the rear slider being interlocked with the front slider is rendered to be moved back and forth, wherein a coupling arm is swingably pivotally supported in a front portion of the rear slider, and the coupling arm is provided with a stopper for regulating the back-and-forth movement of the rear slider by fitting to a locking hole formed in said guide rail, wherein one of said front slider (30) and the coupling arm is provided with a coupling pin and the other thereof is provided with a coupling cam groove interlocking between the front slider and the coupling arm by engaging with the coupling pin, and wherein the front slider is moved backward so that the coupling pin and the coupling cam groove are engaged with each other to thereby swing the coupling arm so that the stopper is disengaged from the locking hole and the rear slider being interlocked with the front slider is rendered to be moved back and forth.

2. The sunroof apparatus according to claim 1, wherein said coupling arm is pivotally supported by the rear slider in a manner of being vertically swingable, and said locking hole is formed in a bottom wall of the guide rail, and the coupling arm is swung upward upon engagement of the coupling pin with the coupling cam groove so that the stopper is disengaged from the locking hole, and when the rear slider is moved back and forth rearward form the locking hole (101) upon disengagement of the stopper from the locking hole (101), the stopper is rendered to slide on the bottom wall of the guide rail.

3. The sunroof apparatus according to claim 1, wherein said front slider is provided with said coupling pin, and said coupling arm is provided with said coupling cam groove.

4. The sunroof apparatus according to claim 1, wherein a spring is provided for biasing said stopper in a direction of being fitted to the locking hole.

5. The sunroof apparatus according to claim 3, wherein a spring is provided for biasing said stopper in a direction of being fitted to the locking hole.

\* \* \* \* \*